United States Patent [19]

Tokunaga

[11] Patent Number: 5,717,959
[45] Date of Patent: Feb. 10, 1998

[54] APPARATUS FOR DETECTING A SIGHT AXIS

[75] Inventor: Tatsuyuki Tokunaga, Yono, Japan

[73] Assignee: Canon Kabushiki Kaisha, Tokyo, Japan

[21] Appl. No.: 812,333

[22] Filed: Mar. 5, 1997

Related U.S. Application Data

[63] Continuation of Ser. No. 692,125, Aug. 5, 1996, abandoned, which is a continuation of Ser. No. 464,224, Jun. 5, 1995, abandoned, which is a continuation of Ser. No. 113,245, Aug. 30, 1993, abandoned.

[30] Foreign Application Priority Data

Sep. 7, 1992 [JP] Japan .................... 4-262749

[51] Int. Cl.$^6$ ..................... G03B 13/02
[52] U.S. Cl. ................ 396/51; 396/277; 396/280
[58] Field of Search .............. 396/51, 277, 280, 396/279

[56] References Cited

U.S. PATENT DOCUMENTS

| 4,924,251 | 5/1990 | Ishimara et al. ........... 354/484 X |
| 5,036,347 | 7/1991 | Tsunekawa et al. ......... 354/62 X |
| 5,182,443 | 1/1993 | Suda et al. .............. 354/219 X |
| 5,214,466 | 5/1993 | Nagano et al. ........... 354/62 X |
| 5,245,371 | 9/1993 | Nagano et al. ........... 354/62 |
| 5,260,734 | 11/1993 | Shindo .................. 354/219 |
| 5,280,312 | 1/1994 | Yamada et al. ........... 351/200 X |
| 5,386,258 | 1/1995 | Nagano .................. 354/219 X |

FOREIGN PATENT DOCUMENTS

| 0441303 | 8/1991 | European Pat. Off. ...... G03B 13/00 |
| 2847368 | 5/1979 | Germany ................. G03B 3/00 |
| 3209973 | 5/1986 | Germany ................. G03B 7/26 |
| 4037907 | 5/1991 | Germany ................. G03B 13/00 |
| 4205350 | 8/1992 | Germany ................. G03B 13/00 |
| 4328277 | 3/1994 | Germany ................. G03B 13/00 |
| 1-274736 | 11/1989 | Japan ................... A61B 3/10 |
| 4242630 | 8/1992 | Japan . |

*Primary Examiner*—W. B. Perkey
*Attorney, Agent, or Firm*—Fitzpatrick, Cella, Harper & Scinto

[57] ABSTRACT

Apparatus for detecting a sight axis may be used with a device for detecting the attachment of a detachable power supply. Forming structure is provided for forming information corresponding to a sight axis of a viewer of the apparatus. Structure is also provided for detecting when the power supply of the apparatus is switched on. Setting structure is provided for setting a first control mode for controlling the apparatus on the basis of the information formed by the forming means, and a second control mode for controlling the apparatus without utilizing the information. Control circuitry is provided for preferably causing the setting structure to automatically set the second control mode when the power supply is detected as being switched on. Preferably, a first storage area is provided for storing correction data unique to the viewer and used for correcting the sight axis information. A second storage area may be provided for storing correction data corresponding to an average of unique correction data from a plurality of viewers. When the unique correction data cannot be used, the average correction data may be substituted therefor. Also, a photographing operation can be delayed until after the sight axis data is corrected. Further, the power supply may be switched off a predetermined time after the sight axis data has been calculated if an exposure operation is not then commanded.

14 Claims, 23 Drawing Sheets

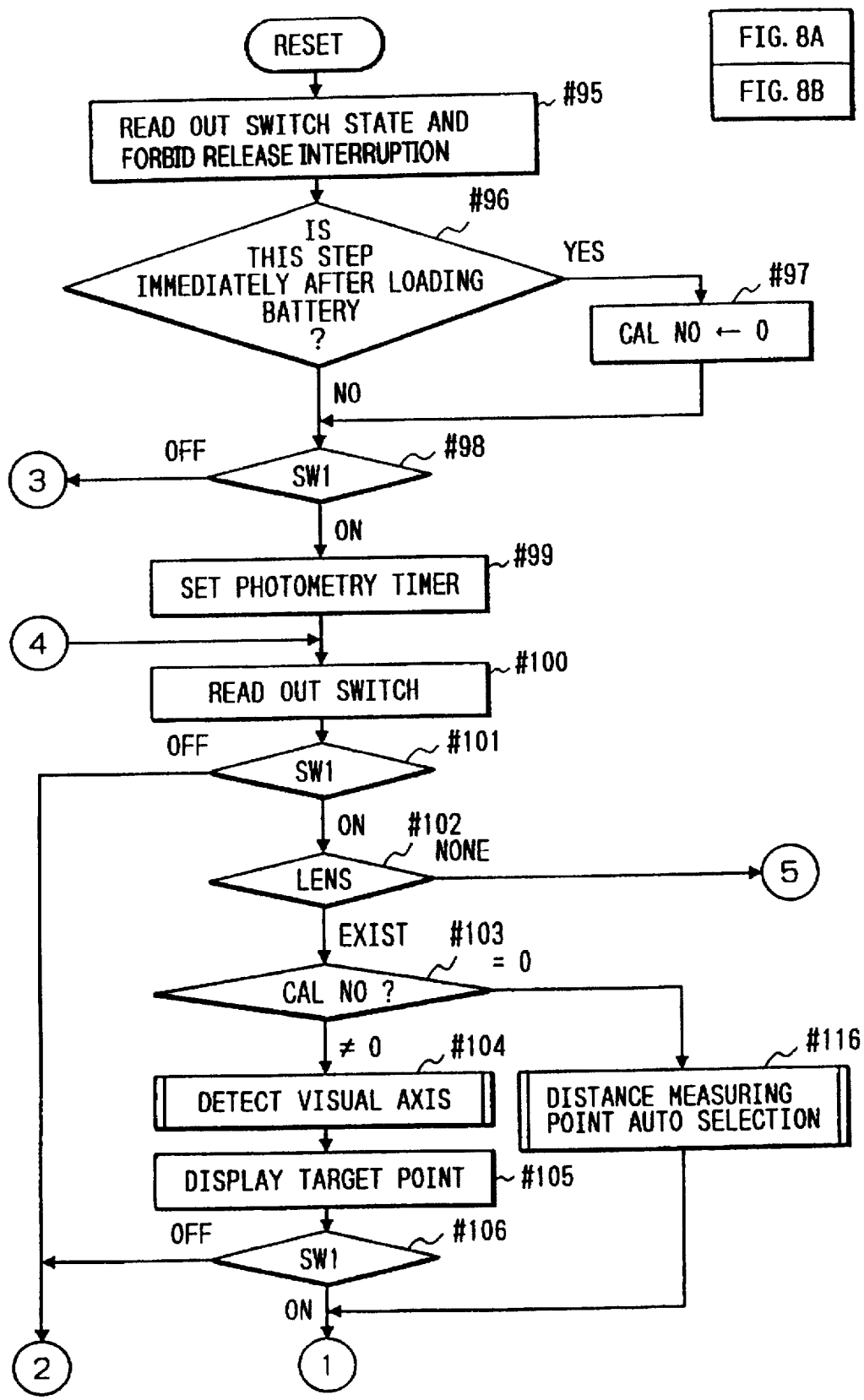

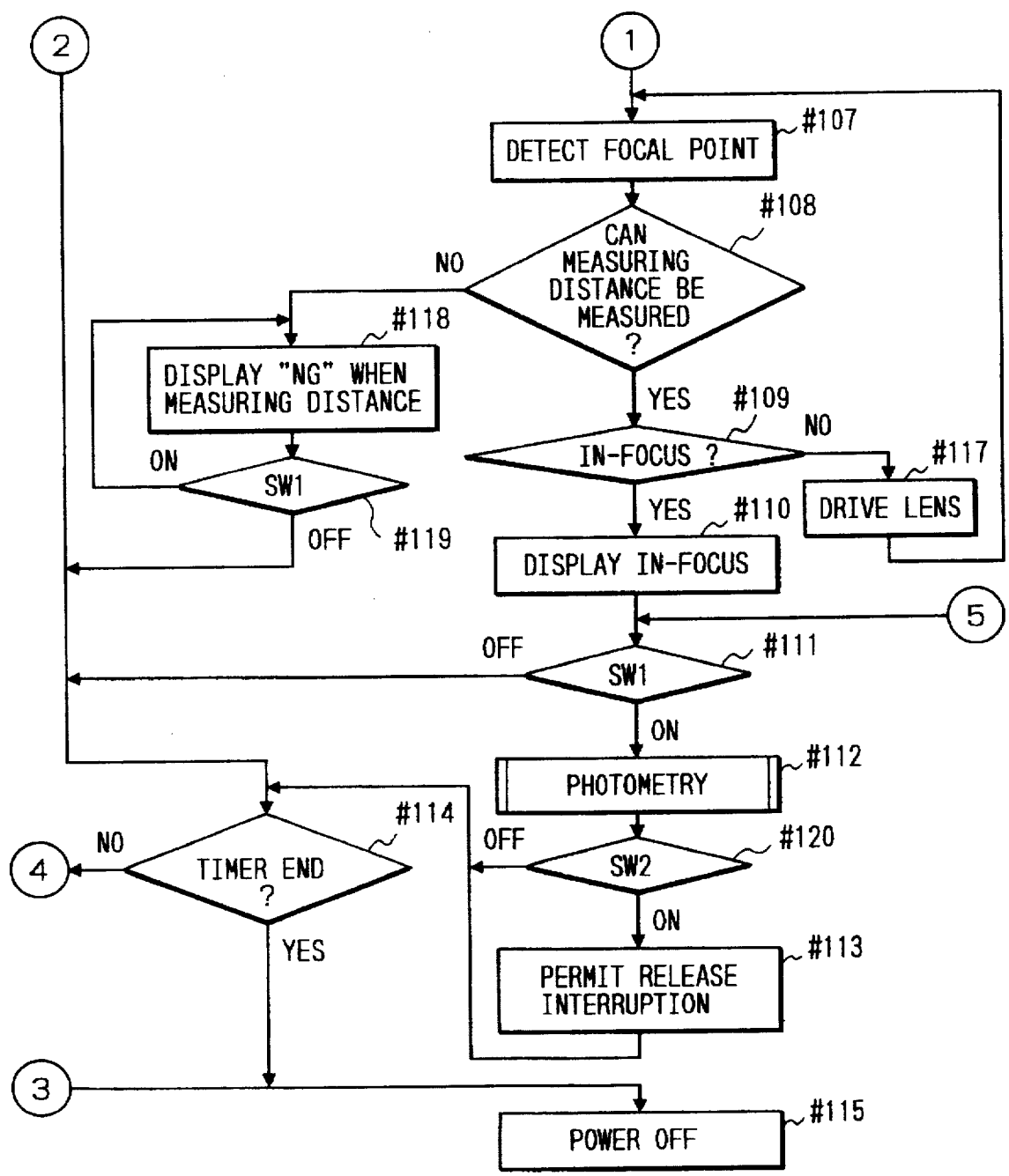

FIG. 22

| CALIBRATION DATA NO. | ax | ko | box | ky | boy | SPECTACLES | RELIABILITY |
|---|---|---|---|---|---|---|---|
| 0 | - | - | - | - | - | - | - |
| 1 | 0 | 0 | 0 | 0 | 0 | 1 | 0 |
| ... | ... | ... | ... | ... | ... | ... | ... |
| 5 | 1 | 0 | 0 | 0 | 0 | 1 | 0 |

APPARATUS FOR DETECTING A SIGHT AXIS

This application is a continuation of application Ser. No. 08/692,125, filed Aug. 5, 1996 abandon, which is a continuation of application Ser. No. 08/464,224 filed Jun. 5, 1995 abandon, which is a continuation of application Ser. No. 08/113,245, filed Aug. 30, 1993, all now abandoned.

BACKGROUND OF THE INVENTION

1. Field of the Invention

The present invention relates to an improvement of an optical apparatus with a sight axis detecting function which includes a sight axis detecting means for detecting rotational angles of the optical axis of an eye ball of the user who views an interior of a finder visual field, and for detecting a sight axis of the user from the rotational angles thereof.

2. Related Background Art

There have hitherto been proposed a variety of apparatuses (e.g., an eye camera) for detecting a position at which a viewer looks at a viewing plane, i.e., a so-called line of sight (sight axis).

According to, e.g. Japanese Patent Application Laid-Open No. 1-274736, parallel rays of light from a light source are irradiated on a front eye part of the eye ball of the viewer. A sight axis is obtained by making most of a cornea reflection image formed by the reflected light from a cornea and an image forming position of a pupil therein.

In Japanese Patent Application No. 3-11492, (Laid-Open No. 4-242630) the assignee of the subject application also proposes an optical apparatus incorporating a function to detect the sight axis, in which various types of photopraphy are performed by use of a correction data collecting (hereinafter termed a calibration) function to correct for individual differences in sight axis between photographers.

FIG. 23 is an explanatory view showing the principle of a method of detecting the sight axis. FIGS. 24A and 24B are explanatory views showing an eye ball image projected on the surface of an image sensor 14 and intensities of outputs from the image sensor 14.

Next, the sight axis detecting method will be explained with reference to FIGS. 23, 24A, and 24B.

Infrared light emitting diodes 13a, 13b are disposed in an X-direction substantially in symmetry with respect to the optical axis of a light receiving lens 12. The eye ball of each viewer (photographer) is divergently illuminated with the light.

A cornea 16 of an eye ball 15 is illuminated by the infrared light projected from the infrared light emitting diode 13b. At this time, the light of a cornea reflection image d formed by some rays of the infrared light reflected on the surface of the cornea 16 is converged through the light receiving lens 12. The cornea reflection image d is re-formed in a position d' on the image sensor 14.

Similarly, the cornea 16 of the eye ball 15 is illuminated by the infrared light projected from the infrared light emitting diode 13a. At this time, the light of a cornea reflection image e formed by some rays of the infrared light reflected on the surface of the cornea 16 is converged through the light receiving lens 12. The cornea reflection image e is re-formed in a position e' on the image sensor 14.

Rays of light from edges a, b of an iris 17 fall on positions a', b' on the image sensor 14, whereby images of the edges a, b are formed at the positions a', b'. If a rotational angle $\theta$ of the optical axis of the eye ball 15 with respect to the optical axis of the light receiving lens 12 is small, coordinates xc of a central position c of the pupil 19 is expressed such as:

$$xc \simeq (xa+xb)/2$$

where xa, xb are respectively the X-coordinates of the edges a, b of the iris 17.

Further, the X-coordinates of a midpoint of the cornea reflection images d, e are coincident with the X-coordinates xo of a curvature center o of the cornea 16. Hence, the rotational angle $\theta$ of the optical axis of the eye ball 15 substantially satisfies the relational formula:

$$(A1 * L_{oc})* \sin\theta \simeq xc-(xd+xe)/2 \tag{1}$$

where xd, xe are the X-coordinates of the positions where the cornea reflection images d, e are formed, $L_{oc}$ is the standard distance from the curvature center o of the cornea 16 to a center c of the pupil 19, and A1 is a coefficient in consideration of an individual difference with respect to the distance $L_{oc}$. For this reason, a sight axis arithmetic processor detects positions of respective characteristic points (the cornea reflection images d, e and the edges a, b of the iris 17) projected on a part of the image sensor 14 as illustrated in FIG. 24B. The rotational angle $\theta$ of the optical axis of the eye ball 15 can be thereby obtained. At this time, the foregoing formula (1) can be rewritten such as:

$$\beta(A1*L_{oc})* \sin\theta \simeq (xa'+xb')/2-(xd'+xe')/2 \tag{2}$$

where $\beta$ is the magnification determined by the position of the eye ball 15 with respect to the light receiving lens 12 and is substantially obtained as a function of a spacing |xd'−xe'| of the cornea reflection images. The rotational angle $\theta$ of the optical axis of the eye ball 15 may be rewritten such as:

$$\theta \simeq ARCSIN\{(xc'-xf')\beta/(A1*L_{oc})\} \tag{3}$$

where $$xc' \simeq (xa'+xb')/2$$

$$xf' \simeq (xd'+xe')/2$$

By the way, the optical axis of the eye ball 15 of the photographer does not coincide with the sight axis. Therefore, when calculating the rotational angle $\theta$ of the optical axis in the horizontal direction, a sight axis $\theta H$ of the photographer in the horizontal direction is obtained by effecting an angular correction $\delta$ between the optical axis and the sight axis. The sight axis $\theta H$ of the photographer in the horizontal direction is given by:

$$\theta H = \theta \pm (B1*\delta) \tag{4}$$

where B1 is a coefficient in consideration of the individual difference with respect to the correction angle $\delta$ between the optical axis of the eye ball 15 and the sight axis. In this formula, the symbol ± has such a meaning that the symbol + is selected when the photographer views through a view device with the left eye, while the symbol − is selected when viewing with the right eye on the assumption that the angle of a rightward rotation with respect to the photographer is positive.

Referring to the same Figure, there is also shown an example where the eye ball of the photographer rotates within a Z-X plane (e.g., a horizontal plane). Even when the eye ball of the photographer rotates within an X-Y plane (e.g., perpendicular plane), the sight axis can be similarly detected. However, a component of the sight axis of the photographer in the perpendicular direction coincides with a component θ' of the optical axis of the eye ball 15 in the perpendicular direction. Hence, the sight axis θV in the perpendicular direction is given by:

$$\theta V = \theta'$$

Further, from the sight axis data θH, θV, positions (xn, yn) on an imaging plate within the finder visual field into which the photographer looks are expressed such as:

$$xn \simeq m * \theta H \qquad (5)$$
$$\simeq m * [ARCSIN \{(xc' - xf)/\beta/(A1 * Loc)\} \pm (B * \alpha)]$$
$$yn \simeq m * \theta V$$

where m is the constant determined by a finder optical system of the camera.

Herein, the photographer fixes the eye on a visual target disposed in a predetermined position within the finder of the camera. The position of the visual target is made coincident with a position of the fixation point calculated in accordance with the formula (5). Values of the coefficients A1, B1 for correcting the individual difference in the eye ball 15 of the photographer are thus obtained.

Normally, arithmetic operations for obtaining a sight axis and a gazing point (target point) of the photographer are executed based on software of a microcomputer of a sight axis arithmetic processor in accordance with the respective formulae given above.

Further, the coefficient for correcting the individual difference in the sight axis generally corresponds to the rotation of the eye ball of the photographer in the horizontal direction. Two visual targets disposed within the finder of the camera are set in the horizontal direction with respect to the photographer.

The coefficient for correcting the individual difference of the sight axis is obtained. Calculated by use of the formula (5) is an imaging plate position of the sight axis of the photographer who looks through the finder of the camera. Information about the sight axis is used for adjusting a focal point of a photographing lens or controlling an exposure.

As described above, the detection of the sight axis at a high accuracy indispensably involves correcting the individual differences when detecting the sight axis. Accordingly, there are collected the correction data for correcting an error due to the individual differences in the sight axis. That is, sight axis calibration has already been proposed by the assignee of the present application.

There arise, however, many drawbacks, wherein the camera becomes difficult to operate because of the required calibration and an additional operation member for the calibration, or extra energy is consumed. The following are explanations of those drawbacks.

1) When photographer uses an optical apparatus (camera) incorporating this sight axis detecting function for the first time, the sight axis can not be detected at a high accuracy unless the calibration is effected as soon as possible. Therefore, the photographer has such an impression that this camera is hard to operate. Besides, even if it is assumed that the calibration may not be conducted, the individual differences when detecting the sight axis can not be corrected. Consequently, there are many mistakes of the detection of the sight axis. This also gives the photographer such an impression that the camera is not easy to use.

2) When operated to detect the sight axis before effecting the calibration, and if the detection of the sight axis is not absolutely accepted, the user comes to have such a fear that the camera may be broken down.

Herein, the way of performing the calibration will be explained briefly. The photographer lightly depresses a release button while gazing at in-finder visual targets located right and left through the finder. The arrangement is such that the coefficients (individual difference correction data) A1, B1 are thereby arithmetically obtained from the eye ball image projected in the image sensor at that time.

3) According to the method given above, the release button is lightly pushed while gazing at the visual targets. This operation is, however, unexpectedly complicated. If the photographer pushes the release button before gazing, a failure to to obtain a correct eye ball image will result. The detection of the proper sight axis will thus be difficult may remarkably decline.

4) In addition, the calibration is performed by lightly pushing the release button. If strongly pushed, however, the operation shifts to an exposure operation, so that the photographer takes an unintended photo.

5) When entering a calibration mode, in-camera electric circuits such as a microcomputer and a CCD are driven simultaneously. The battery is intensively used. Hence, the battery is consumed up soon in cases wherein after entering the operation of the calibration, the photographer does not perform the calibration in a correct manner or stops it halfway; or alternatively, a long period of time has elapsed with an intensive consumption of the battery.

Further, when a number of photographs are taken by the camera, a variety of photographing modes are continuously set. Therefore, the electric circuits for reading switch operations and processing them with the aid of the microcomputer are operated for a predetermined time under a timer provided therein. Under such circumstances, to conserve power, there can be considered a method of switching off a power supply for these other electric circuits for a predetermined time by utilizing the timer. In this method, however, if the user is a little bit unaccustomed and lingers over the calibration, the operations of the the electric circuits may be stopped by the timer during normal photographing. The user has to effect the calibration again from the beginning. The camera is very hard to operate.

6) There unusually exists a case where after inputting the individual difference correction data, a relatively high accuracy in the detection of the sight axis is not obtained from the correction data, and rather default data may be preferable. Alternatively, if the camera is lent to someone to have a photo taken, it is troublesome to perform details of the calibration every time. On this occasion, it is better to detect the sight axis on the basis of the default data. After a plurality of items of the individual difference correction data have been all inputted, however, the default data are lost. The sight detection can not be therefore conducted.

As explained above, the camera incorporating the sight axis detecting function has a problem, in which the camera is not easy to use in its operation before performing the calibration because of requiring the calibration.

Moreover, the calibration described above is different typically from the photographing action. A misoperation may happen because of being unaccustomed thereto. As a result, the inputted individual difference data of the sight axis become inaccurate. This leads to such problems that the accuracy of detecting the sight axis gets worse, or the user may have the impression that the calibration is very hard to perform.

SUMMARY OF THE INVENTION

It is a first object of the present invention to provide an optical apparatus with a sight axis detecting function, which is capable of photographing without effecting relatively troublesome operations for correcting a sight axis when using a camera for the first time, and which allows the user to become accustomed stepwise to photography utilizing the sight axis detecting function.

It is a second object of the present invention to provide an optical apparatus with a sight axis detecting function, which is capable of performing photography utilizing a sight axis detecting function that is accurate to some extent without effecting the relatively troublesome operations for correcting the sight axis.

It is a third object of the present invention to provide an optical apparatus with a sight axis detecting function, which is capable of permitting a photograph to accurately perform, even when unaccustomed to operations for correcting the sight axis, these operations.

It is a fourth object of the present invention to provide an optical apparatus with a sight axis detecting function, which is capable of preventing a failure in taking a photo due to an erroneous execution of an exposure during the correction of the sight axis.

It is a fifth object of the present invention to provide an optical apparatus with a sight axis detecting function, which is capable of preventing a careless consumption of a battery during the correction of the sight axis.

In accordance with an aspect of this invention, there is provided a photographing mode setting means for setting a sight axis inhibition photographing mode when in an initial state. The sight axis inhibition photographing mode is automatically set when in the initial state where a power supply is switched on.

Further, according to another aspect of the present invention, there are provided sight axis detection means, first storage means for storing correction data, second storage means for storing the general individual difference correction data, and control means. The control means controls the photographing function of the basis of the sight axis information given from the sight axis detecting means and the correction data stored in the second storage means when in the initial state in accordance with the sight axis photographing mode. The control means thereafter controls the photographing function on the basis of the sight axis information given from the sight axis detecting means and the correction data stored in the first storage means for storing the correction data calculated by the sight axis correcting means. Provided also are the reset means for returning the individual difference correction data to a general value. The control means controls the photographing function on the basis of the sight axis information given from the sight axis detecting means and the correction data stored in the second storage means when operating the reset means in the sight axis photographing mode. The control means also controls the photographing function on the basis of the sight axis information given from the sight axis detecting means and the correction data stored in the first storage means when the reset means is not operated. The individual difference correction data take the general values (default data) before correcting the sight axis or when operating the reset means.

Further, according to another aspect of the present invention, there is provided the sight axis correcting means for starting the correction of the sight axis after a predetermined time has elapsed since the operation member (for causing the sight axis correcting means to start the correction of the sight axis) has been operated. The sight axis correcting means corrects the sight axis by calculating the individual difference correction data at an interval of a predetermined time from operation of the operation member.

Further, according to another aspect of the present invention, there is provided an operation member for causing the sight axis correcting means to start the correction of the sight axis. Provided also is exposure inhibiting means for inhibiting a shift to an exposure action even when the release operation is conducted during the correction of the sight axis by the sight axis correcting means. The shift to the exposure action is thereby inhibited during the correction of the sight axis.

Further, according to another aspect of the present invention, there is provided power supply control means for starting a timer when the sight axis correcting means begins correcting the sight axis, and for switching off the power supply when the operation member (employed for correcting the sight axis) is not operated for a predetermined time. If the operation member employed in the case of correcting the sight axis is not operated for the predetermined time, the power supply is automatically switched off.

BRIEF DESCRIPTION OF THE DRAWINGS

Other objects and advantages of the present invention will become apparent during the following discussion in conjunction with the accompanying drawings, in which:

FIG. 8 is comprised of FIGS. 8A and 8B which are flowcharts showing a series of actions of the single-lens reflex camera of FIG. 1;

FIG. 22 is an explanatory chart showing types of calibration and initial values in this embodiment;

DESCRIPTION OF THE PREFERRED EMBODIMENTS

The present invention will hereafter be described in detail in accordance with illustrative embodiments.

Figure 1:
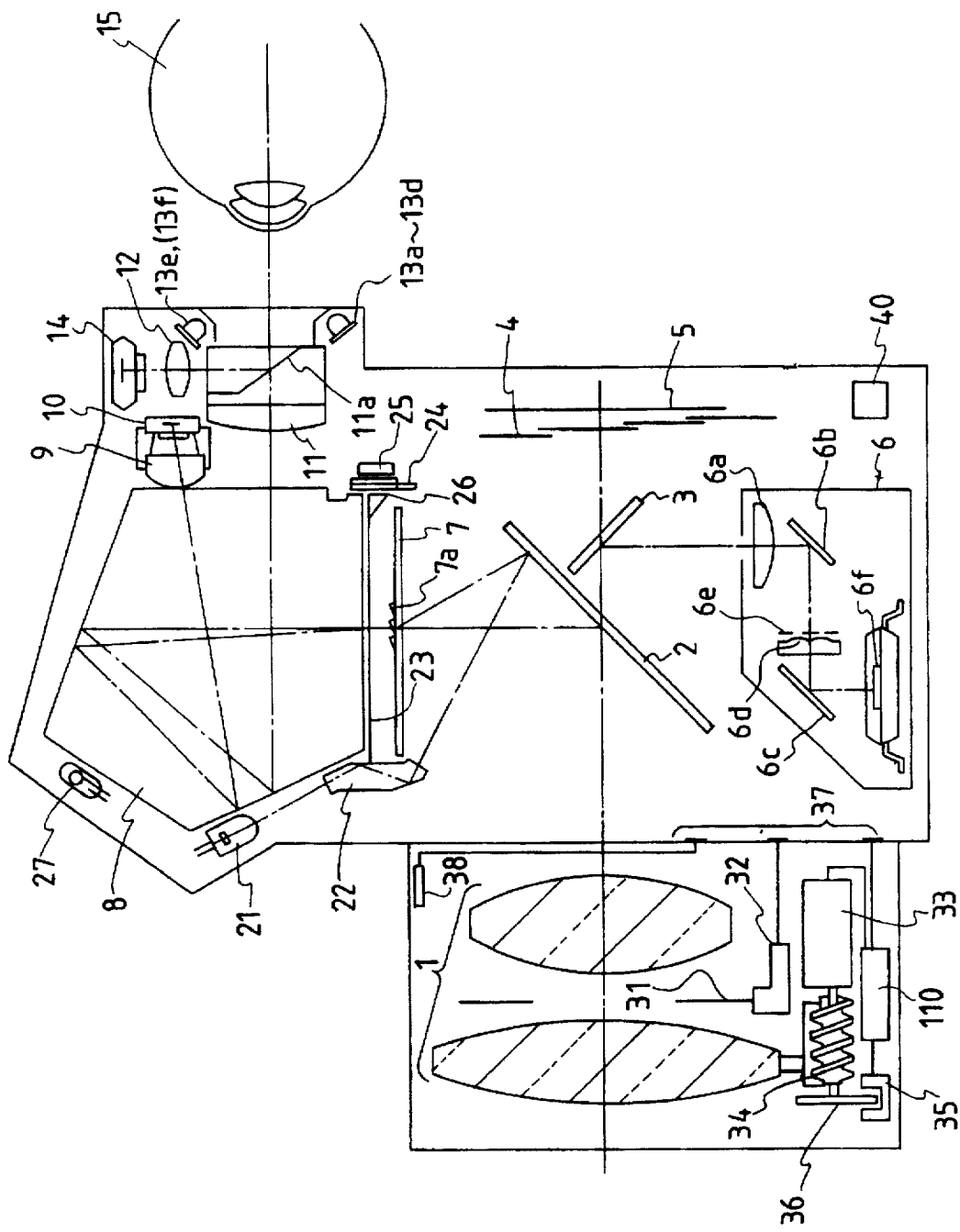
FIG. 1 is a view illustrating a construction of the principal portion in one embodiment where the present invention is applied to a single-lens reflex camera.
Figure 2A:
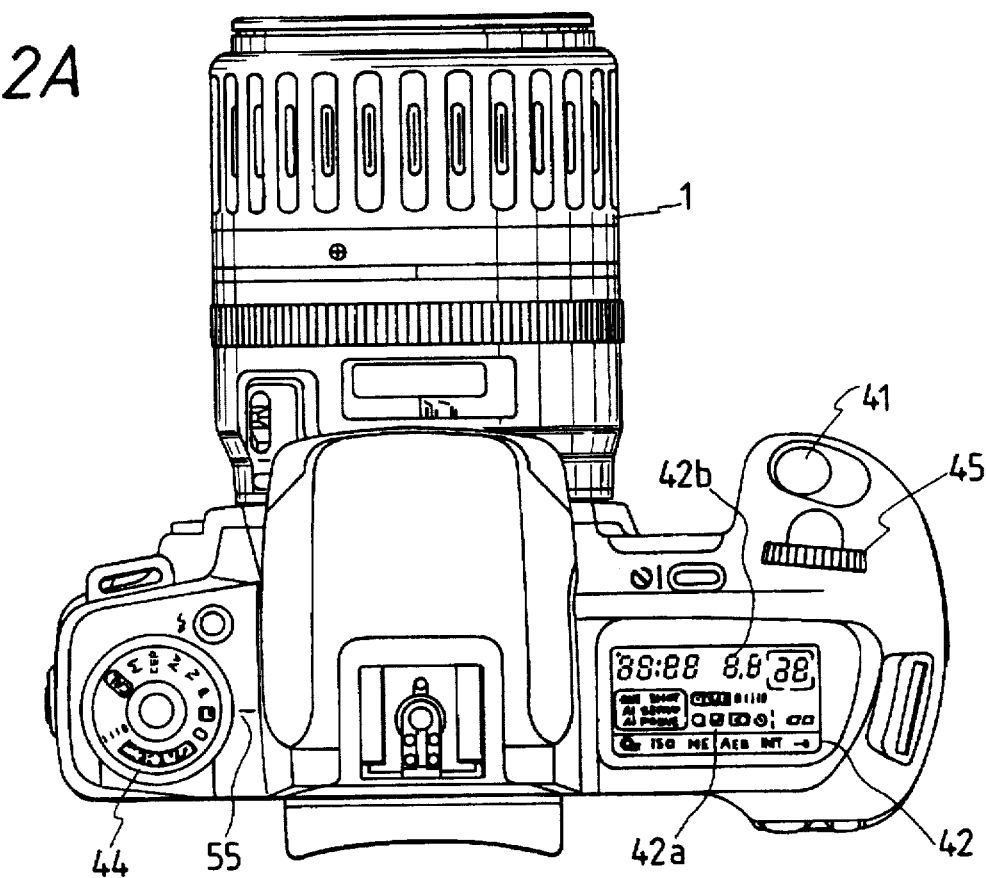
FIGS. 2A and 2B are views showing top and rear surfaces of the single-lens reflex camera of FIG. 1.
Figure 2B:
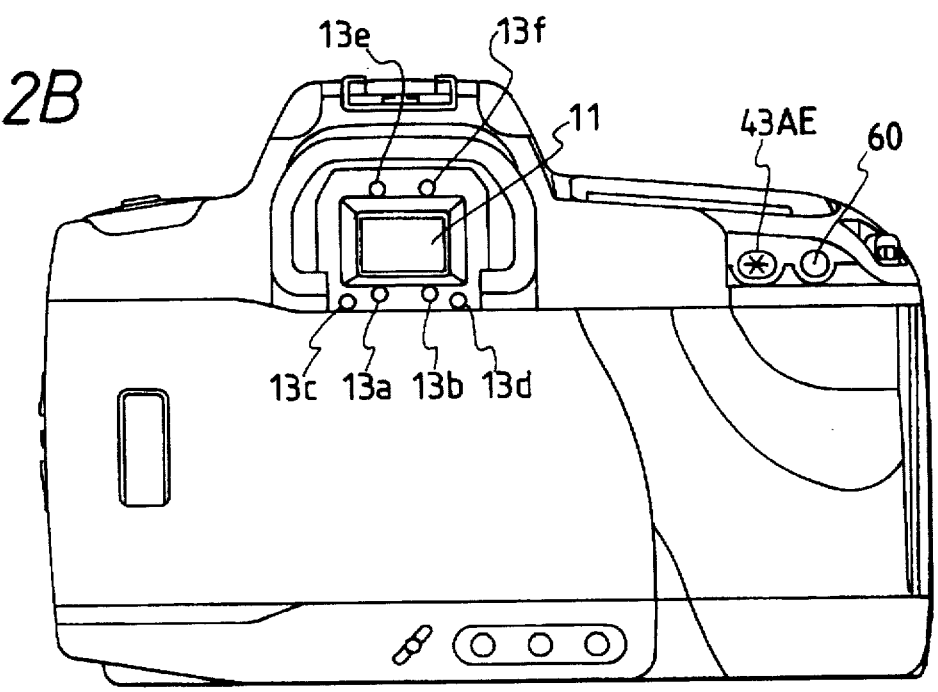
Figure 3:
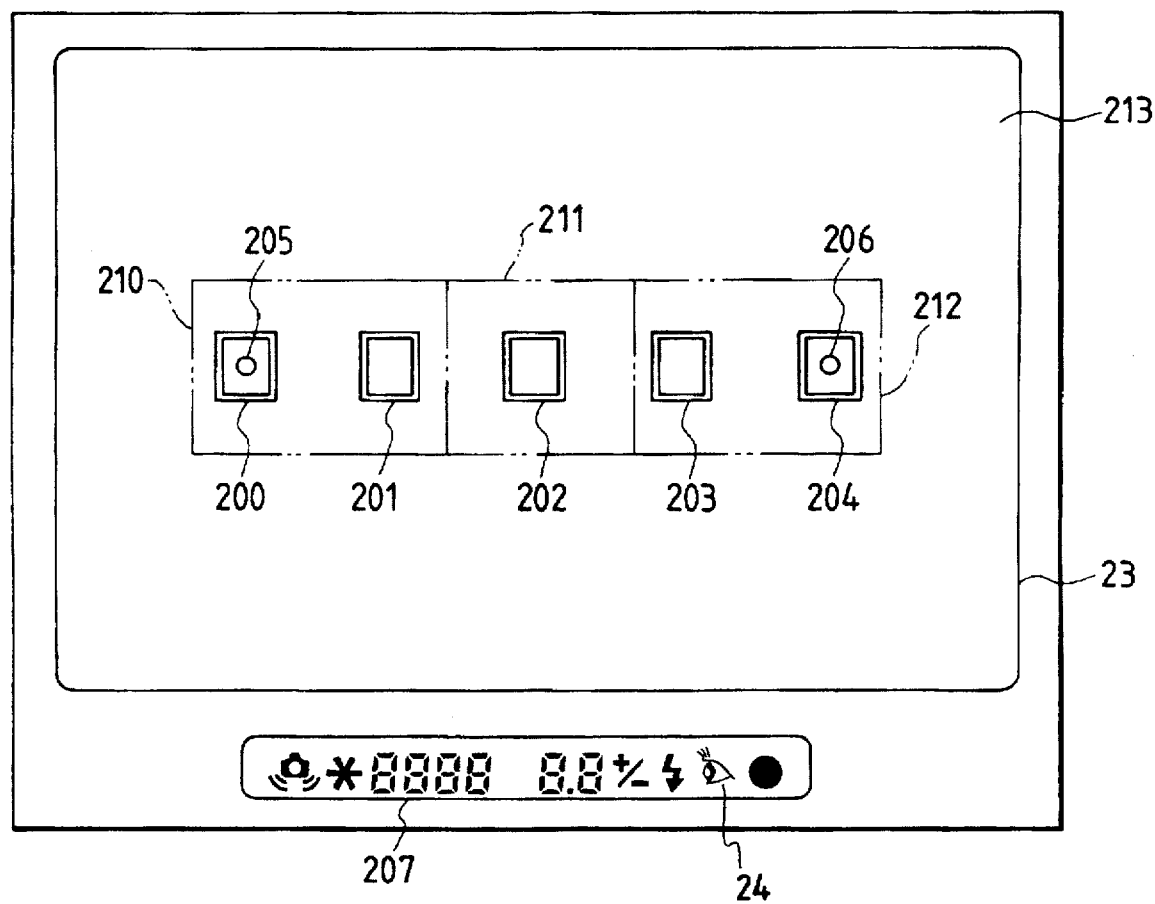
FIG. 3 is an explanatory view showing an interior of a visual field of a finder of FIG. 1.

FIG. 1 is a view schematically illustrating the principal portion in one embodiment where the present invention is applied to a single-lens reflex camera. Similarly, FIGS. 2A and 2B are views schematically showing top and rear surfaces of the camera. FIG. 3 is an explanatory view illustrating a portion within a visual field of a finder shown in FIG. 1.

Referring to these Figures, a photographing lens 1 is, though shown in the form of two lenses for convenience, actually constructed of a further multiplicity of lenses. A main mirror 2 is tilted to a photographing light path or retreated therefrom in accordance with a viewing state of a subject image through a finder system and a photographing state thereof. A submirror 3 reflects beams of light penetrating the main mirror 2 toward a focal point detecting device 6 which is, though this will be mentioned later, disposed in a lower part of a camera body.

The numeral 4 designates a shutter. A photosensitive member 5 is a silver salt film or a solid-state image sensor of a CCD or MOS type, or a camera tube such as a vidicon.

The focal point detecting device 6 comprises a field lens 6a disposed in the vicinity of an image-forming plane, reflex mirrors 6b, 6c, a secondary image-forming lens 6d, an aperture 6e and a line sensor 6f composed of a plurality of CCDs.

The focal point detecting device 6 in this embodiment detects a focal point on a basis of a known phase difference system. This device 6 is constructed such that, as illustrated in FIG. 3, a plurality of areas (five positions) within a view picture (in the finder visual field) serve as distance measuring points by which the focal point is detectable.

An imaging plate 7 is disposed on a prearranged image-forming plane of the photographing lens 1. A pentaprism 8 serves to deflect the finder light path. An image forming lens 9 and a photometry sensor 10 serve to measure a luminance of the subject within each view picture. The image-forming lens 9 provides the imaging plate 7 and the photometry sensor 10 with a conjugate relationship through a reflected light path within the pentaprism 8.

Next, an eyepiece 11 including a beam splitter 11a is located in rear of the pentaprism 8 on the outgoing side thereof. The eyepieces 11 is employed for viewing the imaging plate 7 with an eye 15 of a photographer. 10 The beam splitter 11a is constructed of a dichroic mirror which transmits, e.g., visible light but reflects infrared light.

The numeral 12 denotes a light receiving lens. Designated at 14 is an image sensor in which photoelectric converting elements such as CCDs are arrayed two-dimensionally. The image sensor 14 is so disposed as to be conjugate to the vicinity of a pupil of an eye ball 15 of the photographer which exits in a predetermined position with respect to the light receiving lens 12. Infrared light emitting diodes 13a to 13f each serving as an illumination light source are, as illustrated in FIG. 2B, arranged around the eyepiece 11.

A superimpose LED 21 exhibits a luminance high enough to provide a visually-recognizable-state even in a bright subject. The light emitted therefrom is reflected by the main mirror 2 via a projection prism 22. The reflected light is deflected in a perpendicular direction by fine prism arrays 7a provided in a display portion of the imaging plate 7. The deflected light reaches the eye 15 of the photographer via the pentaprism 8 and the eyepiece 11 as well.

Then, the plurality of positions (distance measuring points) corresponding to the focal point detecting areas of the imaging plate 7 are framed with the fine prism arrays 7a. They are illuminated with the light from five pieces of superimpose LEDs 21 (individually termed LED-L1, LED-L2, LED-C, LED-R1, LED-R2) corresponding the respective positions.

As can be understood from the finder visual field shown in FIG. 3, each of distance measuring point marks 200, 201, 202, 203, 204 is thereby lit up within the finder visual field. The focal point detecting areas (distance measuring points) can be indicated (this is hereinafter called a superimpose indication).

Herein, dot marks 205, 206 are inscribed in internal portions of left and right distance measuring point marks 200, 204. This serves, as will be stated later, as a visual target when collecting sight axis correction data for correcting a detected error of the sight axis depending on a difference in eye balls between individuals, i.e., on the occasion of calibration.

A visual field mask 23 shapes a finder visual field area. An in-finder LCD 24 is intended to display photographing information out of the finder visual field. The in-finder LCD 24 is illuminated with the light from an illumination LED (F-LED) 25.

The light travelling through the in-finder LCD 24 is led by a triangular prism 26 into the finder visual field. This is displayed at 207 in FIG. 3 outwardly of the finder visual field. The photographer is thereby capable of knowing the photographing information. Indicated at 27 is a known mercury switch for detecting a posture of the camera. The numeral 40 represents a battery mounted in the camera.

An aperture 31 is incorporated into the photographing lens 1. A drive unit 32 includes an aperture drive circuit 111 which will be mentioned later. The numeral 33 denotes a lens drive motor, and 34 stands for a lens drive member composed of a drive gear, etc. A photo coupler 35 detects a rotation of a pulse plate 36 interlocking with the lens drive member 34. The photo coupler 35 then informs a lens focal point adjusting circuit 110 of this rotation. The focal point adjusting circuit 110 drives the lens drive motor 33 by a predetermined quantity on a basis of this information and information about a lens drive quantity given from the camera side. The photographing lens 1 is thereby moved to an in-focus position. A mount contact point 37 serves as a known interface between the camera and the lens.

Turning to FIGS. 2A and 2B, the numeral 41 represents a release button. A monitor LCD 42 serves as an outside monitor display unit. The monitor LCD 42 comprises a fixed segment display portion 42a for displaying a predetermined pattern and a 7-segment display portion 42b for displaying variable numerical values. An AE lock button 43 works to hold photometric values. A mode dial 44 is used for selecting a photographing mode, etc. The numeral 55 indicates an index. A CAL reset button 60 is employed for resetting the calibration. Other operation members are not directly associated with the present invention, and, therefore, the explanations thereof will be omitted.

Figure 4A:
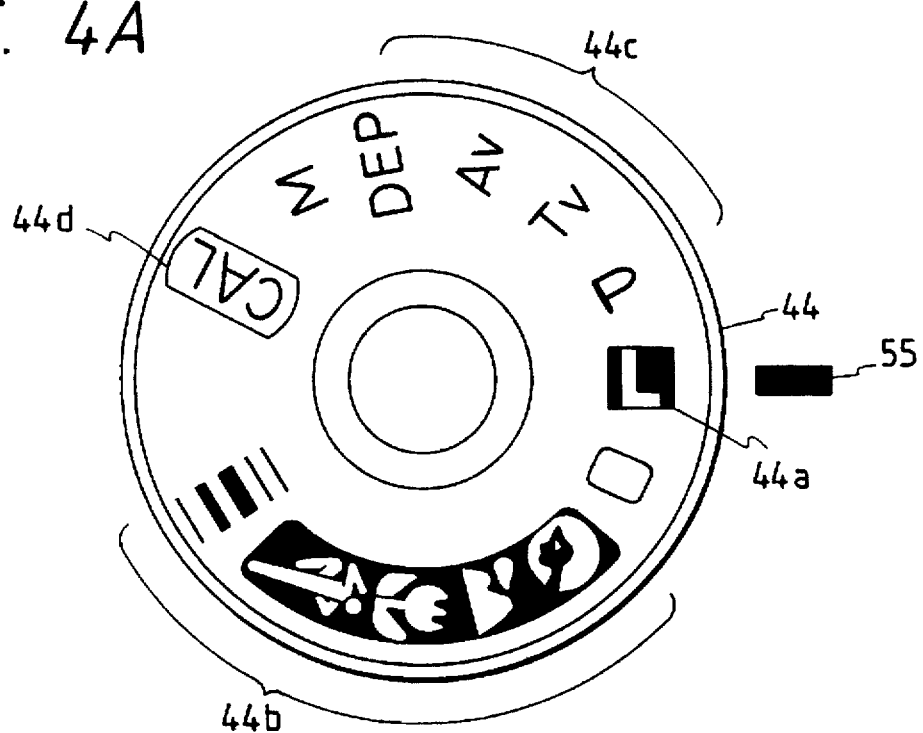
FIGS. 4A and 4B are explanatory views showing a mode dial of FIGS. 2A and 2B.
Figure 4B:
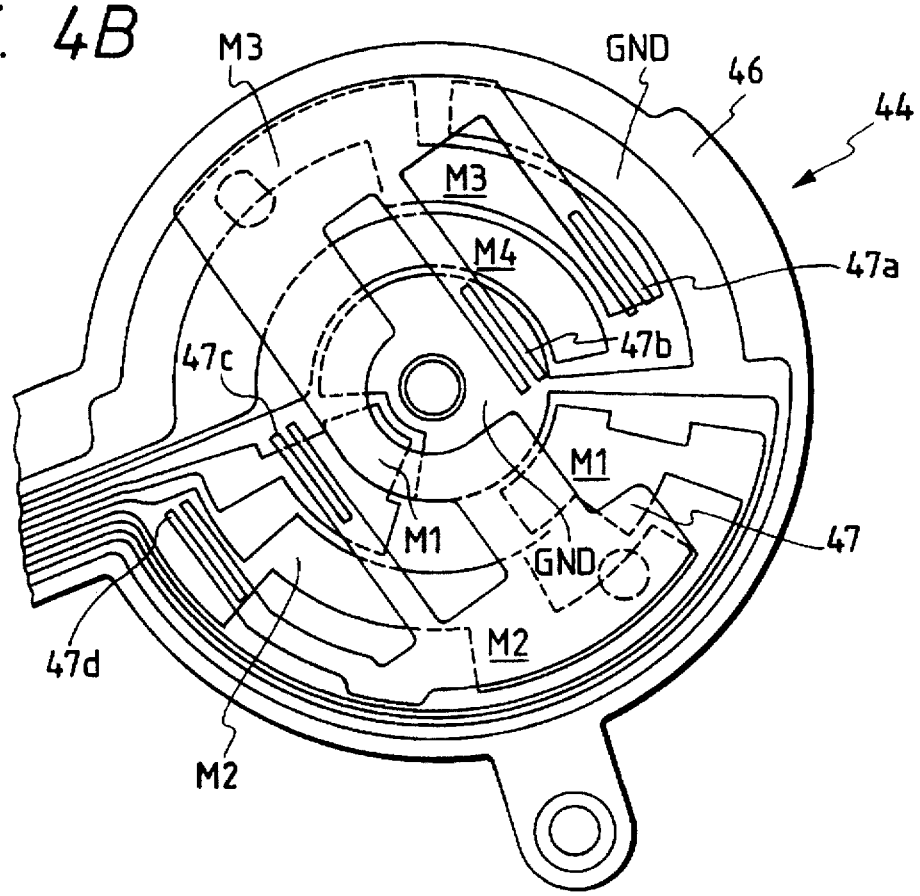

FIGS. 4A and 4B are views each illustrating a configuration of the mode dial 44. The indication is adjusted to the index 55 inscribed in the camera body, whereby the photographing mode is set based on a displayed content thereof.

Referring to FIG. 4A, the symbol 44a represents a lock position in which the camera becomes inoperative. The symbol 44b designates a position of an auto photographing mode controlled by a photographing program preset by the camera. A manual photographing mode 44c in which the photographer can set photographing contents includes photographing modes of a program AE, a shutter priority AE, an aperture priority, a depth-of-field priority AE and a manual exposure. In a [CAL] position 44d, a calibration mode for performing the calibration of a sight axis is set, which will be mentioned below.

FIG. 4B illustrates an internal structure of the mode dial 44. Designated at 46 is a flexible printed circuit board 46 on which patterns (M1, M2, M3, M4) of a switch conceived as a mode dial switch and a GND pattern are, as shown in the Figure, laid out. Twelve positions shown in 4 bits by means of the mode dial 44 can be set by sliding four contact submembers of a switch contact member 47 interlocking with rotations of the mode dial 44.

Referring again back to FIGS. 2A and 2B, an electronic dial 45 rotates to generate click pulses and thereby selects a set value further selectable in the mode selected by the mode dial 44. For instance, when selecting a photographing mode of the shutter-priority through the mode dial 44, a presently-set shutter speed is displayed on the in-finder LCD 24 as well as on the monitor LCD 42. The arrangement is such that when the photographer rotates the electronic dial 45, the presently-set shutter speed sequentially changes in accordance with a rotating direction of the dial 45.

Figure 5A:
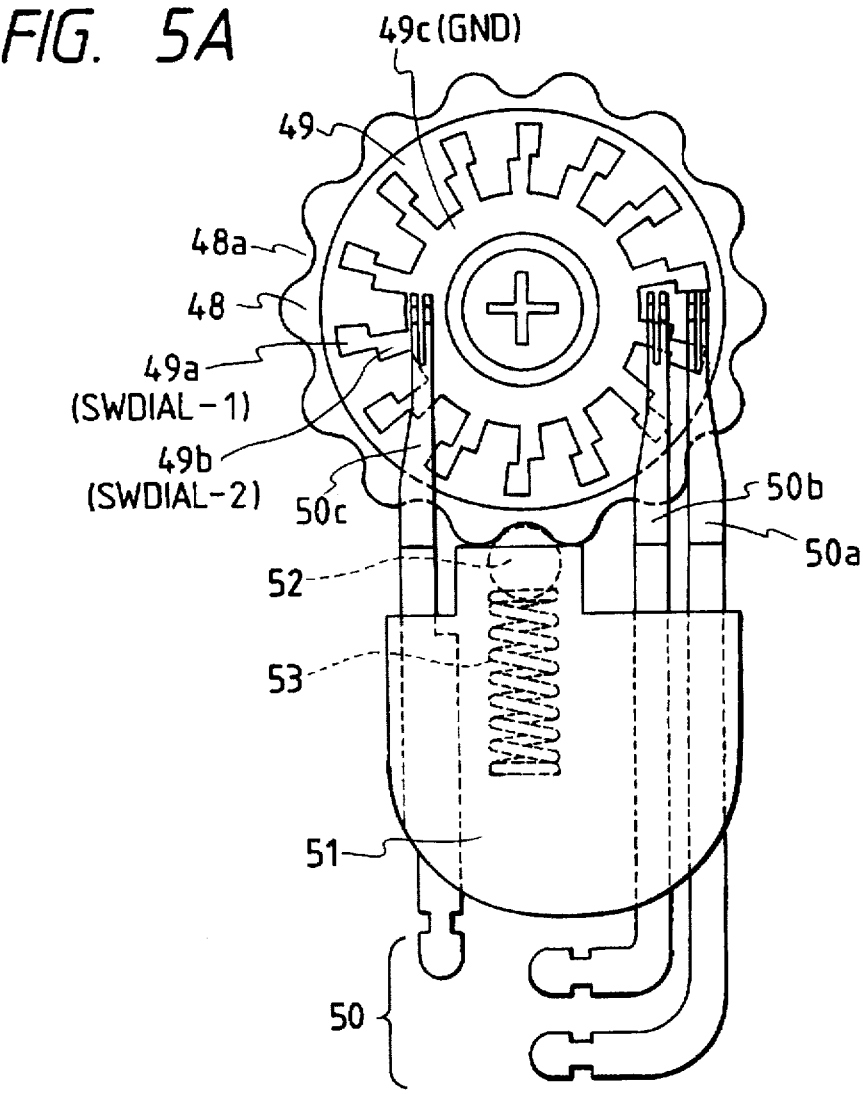
FIGS. 5A and 5B are explanatory views showing an electronic dial of FIGS. 2A and 2B.
Figure 5B:
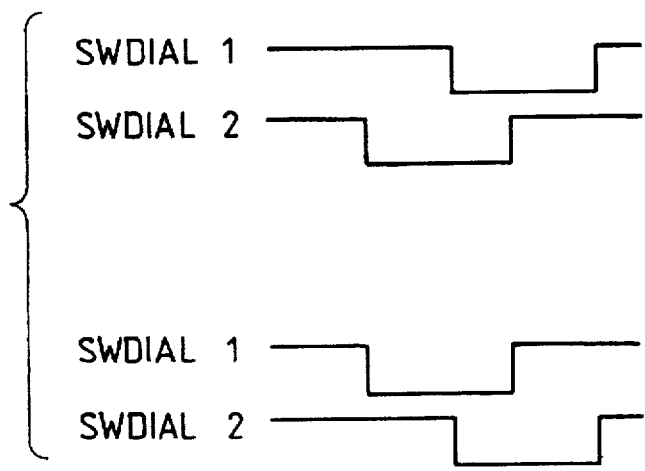

FIGS. 5A and 5B are views fully illustrating an internal structure of the electronic dial 45.

Referring to the same Figures, a click plate 48 rotating together with the electronic dial 45 is disposed. A printed circuit board 49 is fixed thereto. Disposed, as illustrated in the Figures, on the printed circuit board 49 are switch patterns 49a (SWDIAL-1), 49b (SWDIAL-2) and a GND pattern 49c. A switch member 50 having three slide contact submembers 50a, 50b, 50c is fixed to a fixing member 51.

Click balls 52 are fitted in recesses 48a formed in the outer peripheral portion of the click plate 48. A fixing member 51 holds a coil spring 53 for biasing the ball.

Further, the slide contact submembers 50a, 50b are not in contact with both of the switch patterns 49a, 49b in a normal position (when the click ball 52 is fitted in the recess 48a).

In the thus constructed electronic dial 45, when the photographer rotates the dial clockwise in FIGS. 5A and 5B, the slide contact submember 50a at first contacts with switch pattern 49a. Thereafter, the slide contact submember 50b contacts the switch pattern 49a. A set value is counted up at this timing. When rotated counterclockwise, a relationship between the slide contact submembers and the switch patterns is just reverse to the above-mentioned. The set value is this time counted down at the same timing.

FIG. 5B is a timing chart showing this situation. FIG. 5B also illustrates pulse signals generated in the switch patterns 49a and 49b when rotating the electronic dial 45 and timings thereof. The upper portion thereof shows a case where a 1-click rotation is made counterclockwise, while the lower portion illustrates a case where the rotation is made clockwise. Timings of count-up and count-down and also its rotating directions are thus detected.

Figure 6:
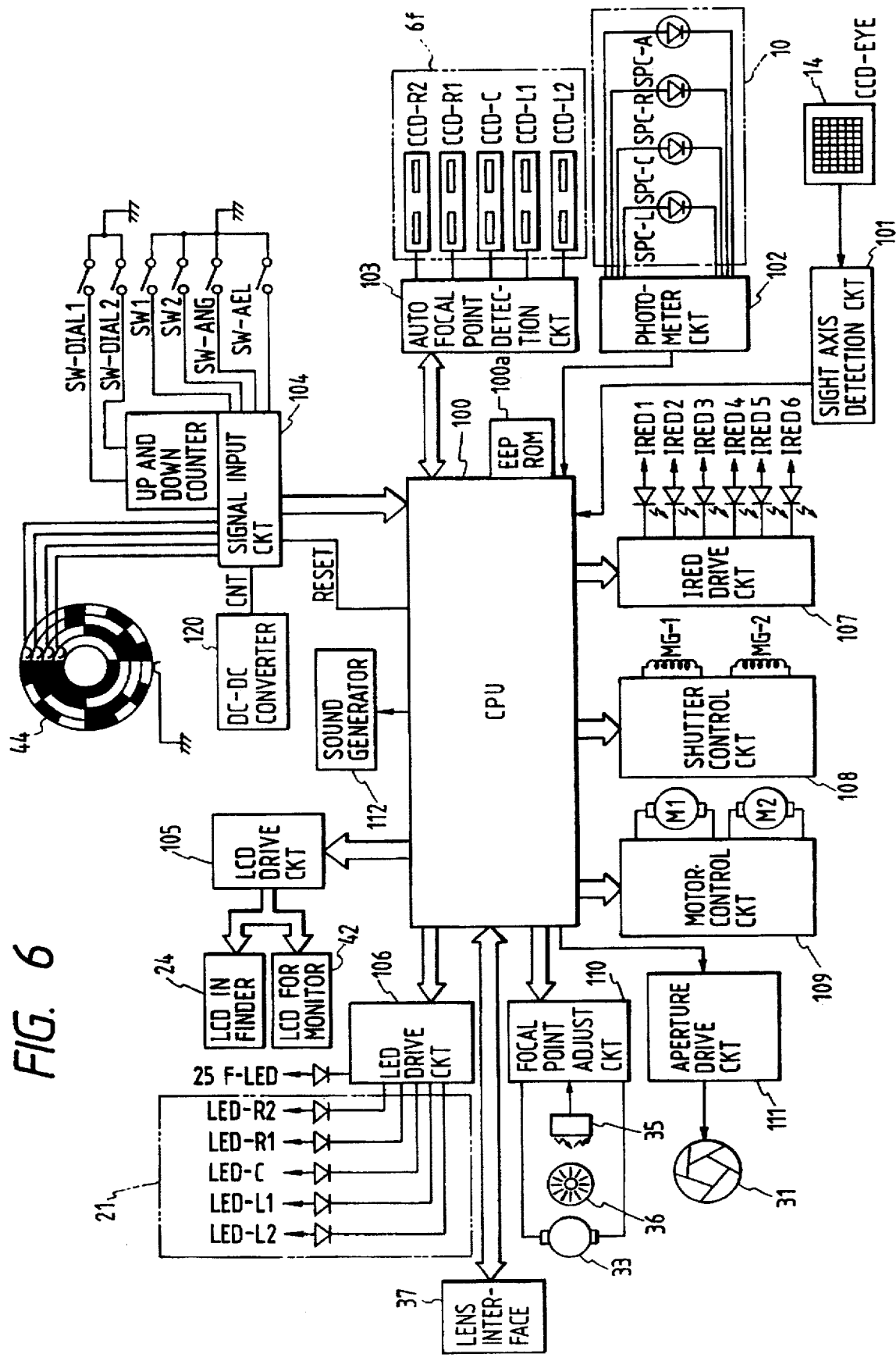
FIG. 6 is a block diagram illustrating a construction of the principal portion of the single-lens reflex camera of FIG. 1.

FIG. 6 is an explanatory diagram showing a built-in electric circuit of the single-lens reflex camera constructed as described above. The same portions as those in FIG. 1 are marked with the like numerals.

Connected to a central processing unit (CPU) 10 of a microcomputer incorporated into the camera body are a sight axis detection circuit 101, a photometry circuit 102, an auto focal point detection circuit 103, a signal input circuit 104, an LCD drive circuit 105, an LED drive circuit 106, an IRED drive circuit 107, a shutter control circuit 108, a motor control circuit 109 and a sounding unit 112. Further signals are transmitted between the aperture drive circuit 111 and the focal point adjusting circuit 110 disposed within the photographing lens 1 through a mount contact (lens interface) 37.

An EEPROM 100a incidental to the CPU 100 incorporates a function as a memory means to store sight axis correction data for correcting a difference in sight axis between individuals. When setting the [CAL] position of the mode dial 44 to the index 55, a calibration mode for correction of the individual difference in the sight axis is selectable. It is thus possible to select a calibration number corresponding to each item of calibration data, turn off a calibration action, and set an inhibition mode of detecting the sight axis through the electronic dial 45.

A plurality of items of the calibration data can be set. The calibration data are effective in making distinctions between the users of the camera or in cases where even the same user has different view conditions, for instance, the user with spectacles or no spectacles, or when using a sight axis correction lens or no such lens.

Further, the EEPROM 100a stores the calibration number selected at that time, or a state of the set sight axis mode in the form of calibration numbers (1, 2, 3, . . . or 0) which will be mentioned later.

The sight axis detection circuit 101 performs an A/D conversion of a signal of an eye ball image which is transmitted from the image sensor 14 (CCD-EYE). This image information is then transmitted to the CPU 100. The CPU 100 effects sampling of respective characteristic points of the eye ball image which are necessary for detecting the sight axis in accordance with a predetermined algorithm. The CPU 100 calculates the sight axis of the photographer from positions of the respective characteristic points.

The photometry circuit 102, after amplifying the signal transmitted from the photometry sensor 10, executes a logarithmic compression and the A/D conversion of the signal. The thus-processed signal is transmitted as luminance information of each sensor to the CPU 100. The photometry sensor 10 is, as illustrated in FIG. 3, constructed of photo diodes SPC-L, SPC-C, SPC-R, SPC-A for measuring the light of four areas. The photo diode SPC-L measures the light of a left area 210 including left distance measuring points 200, 201 within the finder visual field. The photo diode SPC-C measures the light of a central area 211 including a distance measuring point 202. The photo diode SPC-R measures the light of a right area 212 including right distance measuring points 203, 204. The photo diode SPC-A measures the light of a peripheral area 213 thereof.

A line sensor 6f is, as illustrated in FIG. 6, a known CCD line sensor comprising five line subsensors CCD-L2, CCD-L1, CCD-C, CCD-R1, CCD-R2 corresponding to the five distance measuring points 200 to 204 within the picture.

The auto focal point detection circuit 103 effects an A/D conversion of a voltage obtained from the line sensor 6f and the result to the CPU 100.

A switch SW-1 turned on at a first stroke of the release button 41 works to start actions of photometry, AF and detection of the sight axis. A switch SW-2 is turned on at a second stroke of the release button. A posture detection switch SW-ANG is detected by the mercury switch 27 shown in FIG. 1. An AE lock switch SW-AEL is turned on by depressing an AE lock button 43. Dial switches SW-DIAL1, SW-DIAL2 are provided within the electronic dial 45 which has been already explained. Signals are inputted to an up-and-down counter of the signal input circuit 104, thereby counting a rotation click quantity of the electronic dial 45. Dial switches SW-M1 to SW-M4 are provided in the already-explained mode dial 44. A switch SW-CRST is turned on by depressing a CAL reset button 60.

State signals of these switches are inputted to the signal input circuit 104 and transmitted via a data bus to the CPU 100.

The LCD drive circuit 105 has a known construction for display-actuating liquid crystal display element LCDs. Based on the signals from the CPU 100, an f-number, a shutter speed, a set photographing mode, etc. can be displayed simultaneously on the monitor LCD 42 and the in-finder LCD 24 as well.

The LED drive circuit 106 effects the control to light up and flicker the illumination LED (F-LED) 25 and the superimpose LED 21.

The IRED drive circuit 107 selectively lights up infrared light emitting diodes (IRED1 to IRED6) 13a to 13f according to situations.

The shutter control circuit 108 controls a magnet MG-1 for tripping a leading curtain and a magnet MG-2 for tripping a trailing curtain when energized, whereby a photosensitive member is exposed with a predetermined quantity of light.

The motor control circuit 109 controls a motor M1 for winding and rewinding a film and a motor M2 for applying charges to the main mirror 2 and the shutter 4.

A series of release sequence actions of the camera are performed by the shutter control circuit 108 and the motor control circuit 109.

The signal input circuit 104 has a role of controlling a power supply of the electric circuits including the CPU 100. More specifically, the signal input circuit 104 is supplied with the power always together with the LCD drive circuit 105 but consumes a small amount of electricity. At this time, other circuits including the CPU 100 which consume a large amount of electricity are not supplied with the power. Then, the photographer operates the operation member such as the camera mode dial 44 or the release button. When even one of the plurality of switches changes in terms of its state, the signal input circuit 104 starts a DC-DC converter 120 in response to a CNT signal. The DC-DC converter 120, when started, supplies the CPU 100 and other electric circuits with the power. The signal input circuit 104 simultaneously causes the CPU 100 to operate in accordance with a RESET signal. The CPU 100, after executing a predetermined action which will hereinafter be stated, gives the signal input circuit 104 an instruction to switch off the power supply. The signal input circuit 104 sets the DC-DC converter 120 in a halt state in response to a CNT signal but resets the CPU 100 on the basis of the RESET signal. The electric circuits as a whole are thereby put in a low power consumption mode.

Further, the signal input circuit 104 has a built-in output circuit such as an existing RS flip-flop. This output circuit becomes [1] when switching on the battery but becomes [0] when the CPU 100 once reads a signal of the switch. The CPU 100 reads this output circuit, thereby making it possible to judge whether the battery is just switched on or not.

Figure 7A:
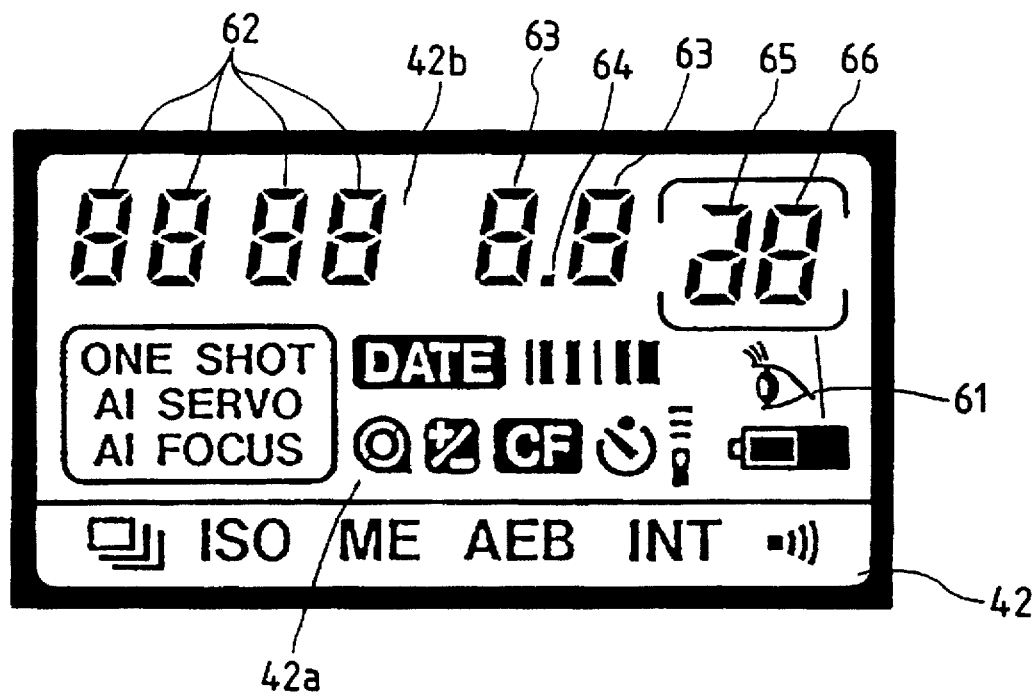
FIGS. 7A and 7B are views showing full light-up states of a monitor LCD and an in-finder LCD in this embodiment.
Figure 7B:
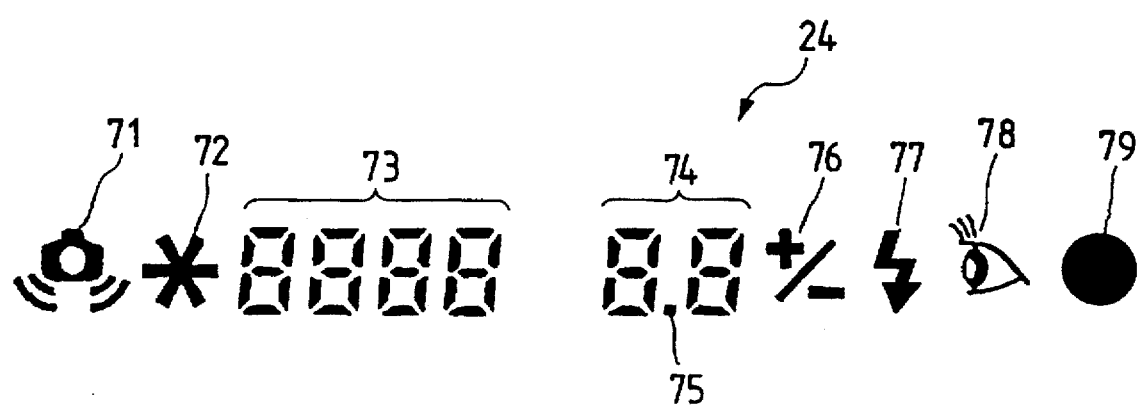
Figure 9:
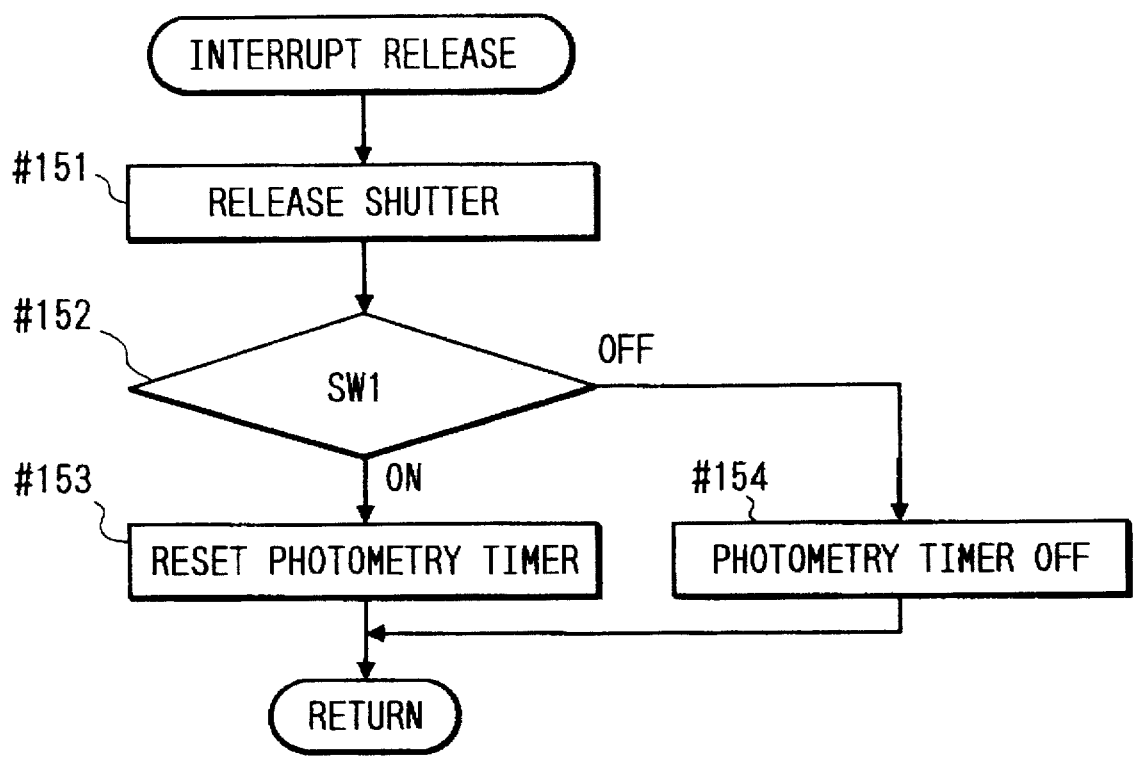
FIG. 9 is a flowchart showing actions when a release interruption takes place during the actions shown in FIGS. 8A and 8B.

FIGS. 7A and 7B show contents of whole display segments of the monitor LCD 42 and the in-finder LCD 24 illustrated in FIGS. 2A and 2B.

Referring to FIG. 7A, a fixed segment display portion 42a is provided with a sight axis input mode indication 61 other than indications of known photographing modes. The sight axis input mode indication 61 indicates that the photographing actions such as an AF action of the camera and a selection of the photographing mode are performed by detecting the sight axis with the aid of sight axis information. A 7-segment display portion 42b for displaying the variable numerical values comprising a 4-digit 7-segment portion 62 for displaying a shutter speed, a 2-digit 7-segment portion 63 for displaying an f-number, a decimal point 64, a limited numerical value display segment portion 65 for displaying a film serial number and a 1-digit 7-segment portion 66. An explanation of others will be omitted.

Turning to FIG. 7B, the numeral 71 represents a camera shake alarming mark, and 72 designates an AE lock mark. The numerals 73, 74, 75 denote segment portions for similarly displaying the shutter speed and the f-number. Indicated at 76 is an exposure correction setting mark. The numeral 77 stands for a strobe charge completion mark. A sight axis input mark 78 indicates a sight axis input state. An in-focus mark 79 shows an in-focus state of the photographing lens 1.

Given next is an explanation of the operation of the camera incorporating a sight axis detecting function and set not in the calibration mode but in an ordinary photographing state. The explanation is made with reference to flowcharts of FIGS. 8A, 8B, and 9 and FIGS. 10A, 10B, 10C, 11A, and 11B (it is assumed in this embodiment that the shutter priority AE is set by the mode dial 44).

To start with, the mode dial 44 is rotated, whereby the signal input circuit 104 actuates the DC-DC converter 120 to cancel the reset of the CPU 100. With this action, the CPU 100 at first reads out a state of each switch from the signal input circuit 104. The data are stored in a RAM in the CPU 100 (step 98). Further, a release interruption which will be mentioned later is inhibited to prevent a shift to the release action till the detections of a sight axis and a focal point and also the photometry are finished (step 95). In the data stored, a data discrimination is made as to whether or not the step is immediately after switching on the power supply (step 96). If immediately after switching on the battery, the data of the calibration number is rewritten to "0", this calibration number implying which data to use among items of individual difference correction data "1" to "5" in the EEPROM 100a (step 97). The action proceeds to step 98 wherein the calibration number "0" implies a sight axis inhibition mode (sight axis photographing inhibition mode). Further, if not after switching on the battery, the action goes directly to step 98. Whether or not the switch SW1 is turned on by depressing the release button 41 is judged therein. If the switch SW1 is not turned on, the power supply is switched off (step 115). The action shifts to the low power consumption mode to subsequently wait for a change in the switch.

When the signal input circuit 104 detects the turn-on of the switch SW1 by depressing the release button 41, the CPU 100 sets the photometry timer (step 99). This action intends to keep the power supply in an on-state for a certain duration of time (e.g., 6 seconds) (to put the CPU 100 in an active state). It is because the setting has to be done again from the beginning, if the power supply is turned off with no variation in the switch despite the fact that setting has been done halfway when the photographer operates the camera. Then, the CPU 100 reads states of a variety of switches from the signal input circuit 104 and confirms whether or not the state changes from the last time (step 100). Herein, if the state changes (e.g., the shutter priority AE changes to the aperture priority AE; and the electronic dial is counted up and so forth), a mode thereof is stored in the RAM. Thereafter, this is related to the setting (the shutter speed, the f-number, etc.). Further, an indication through the LCD drive circuit 105 is also effected at this time.

Next, whether the switch SW1 is turned on is judged (step 101). If turned off, whether the photometry timer comes to an end or not is judged (step 114). If the timer has already been finished, the power supply is switched off (step 115). Whereas if the time is not finished, there is formed a loop such as: step 114→step 100→step 101. The action is to wait till the switch SW1 is turned on while monitoring variations in the switch, or till the time comes to the end.

When the switch SW1 is turned on, whether the lens is mounted or not is judged from the lens interface 37 (step 102). If not mounted, the actions of detecting the sight axis and detecting the focal point are not conducted (steps 103 to 110), and, instead, the action proceeds to step 111. Further, if the lens is mounted, the CPU 100 reads the calibration number data of the EEPROM 100a (step 103). When the data is "0", this implies a mode of executing no detection of the sight axis. Hence, a specific distance measuring point is selected by a distance measuring point auto selection subroutine without executing the detection of the sight axis, i.e., without using the sight axis information (step 116). The auto focal point detection circuit 103 detects the focal point at this distance measuring point (step 107).

Note that some methods may be contemplated as algorithms for automatically selecting the distance measuring point, however, this is not associated directly with the present invention, and its explanation will be omitted herein.

When the data of the calibration number is not "0" but ranges from "1" to "5", the CPU 100 reads an item of individual difference correction data corresponding to the calibration data from the EEPROM 100a. The sight axis detection circuit 101 executes a detection of the sight axis in accordance with the calibration data thereof (step 104).

At this time, the calibration is not executed only once with respect to the number corresponding to the calibration data. In this case, the arrangement is such that the EEPROM 100a previously stores a mean value (default data) of eyes of thousands of people, though a detection accuracy becomes lower than when utilizing the individual difference correction data through the calibration, the sight axis can be detected at a considerably high probability.

In accordance with this embodiment, it is assumed that the mode dial 44 is in a position of the shutter priority AE. Accordingly, a position of the sight axis of the photographer is calculated based on the sight axis detection subroutine (step 104). Then, the sight axis detected in the sight axis detection circuit 101 is converted into coordinates of a gazing point (target point) on the imaging plate 7. The CPU 100 selects a distance measuring point in close proximity to the gazing point coordinates. The CPU 100 transmits a signal to the LED drive circuit 106, and the distance measuring point mark is flicker-displayed by use of the superimpose LED 21 (step 105). Further, the CPU 100 actuates the LCD drive circuit 105. The photographer is capable of confirming that the camera is on the detection of the sight axis through the off-finder-picture portion 207 because of lighting up the sight axis input mark 78 of the in-finder LCD 24 (see FIG. 10A). Additionally, a set shutter speed is displayed in the 7-segment portion 73 (an example of the shutter priority AE of 1/250 sec. is given by way of the embodiment).

Figure 10A:
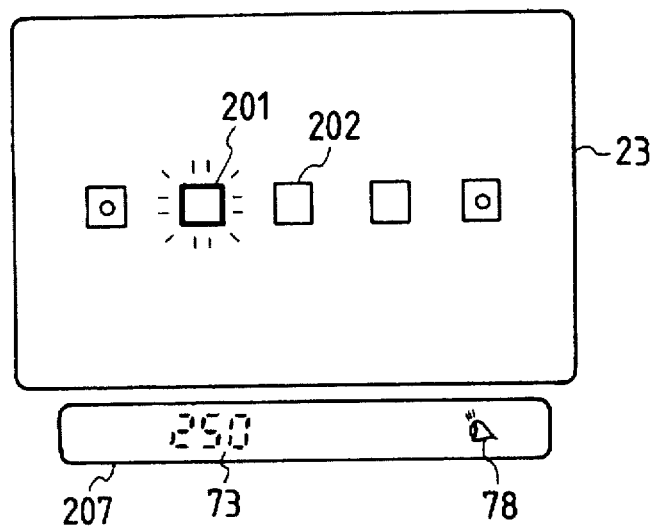
FIGS. 10A, 10B and 10C are views for explaining the actions of FIGS. 8A and 8B, illustrating indications on the in-finder LCD.
Figure 10B:
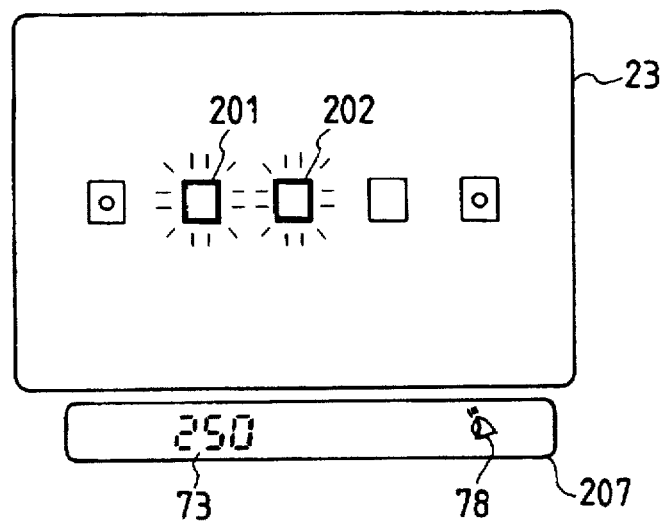
Figure 10C:
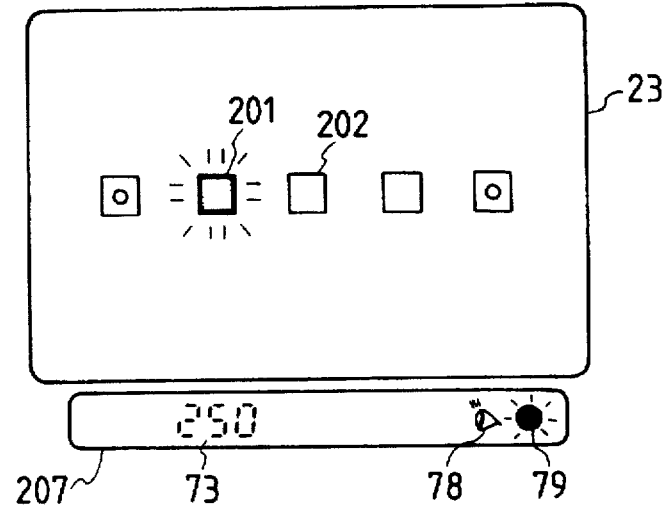

FIGS. 10A and 10C show a state where the distance measuring point mark 201 is selected as one example. Further, at this moment, the CPU 100, when a reliability on the gazing point coordinates detected by the sight axis detection circuit 101 is small, transmits a signal given an indication by changing the number of the distance measuring points selected corresponding to a degree of this reliability.

FIG. 10B illustrates a state where the reliability on the gazing point is smaller than in the state of FIG. 10A, and the distance measuring point marks 201, 202 are selected.

The photographer looks at an indication of the distance measuring point selected depending on the sight axis. The photographer, when recognizing that this distance measuring point is incorrect, separates the hand from the release button 41. The switch SW1 is thereby turned off (step 106). Hereat, there is formed the above-mentioned loop such as: step 114→step 100→step 101. The action is to wait till the timer is finished (step 114), or till the switch SW1 is turned on (step 101).

The photographer is thus informed of the fact that the distance measuring point is selected on a basis of the sight axis information by flicker-displaying the distance measuring point mark within the finder visual field. The photographer is thereby capable of confirming whether or not the selection is made as he or she intends.

Further, the photographer looks at the indication of the distance measuring point selected based on the sight axis, and if consecutively the switch SW1 is kept on (step 106), the auto focal point detection circuit 103 executes a detection of the focal point through one or more distance measuring points by use of the detected sight axis information (step 107).

Judged next is whether or not the selected distance measuring point is incapable of measuring the distance (step 108). If incapable, the CPU 100 transmits a signal to the LCD drive circuit 105. The in-focus mark 79 of the in-finder LCD 24 is thereby flickered as shown in FIG. 10C. An alarm saying that the distance measurement is NG (impossible) is given to the photographer (step 118). This operation continues till the switch SW1 is turned off (step 119).

Whereas if capable of measuring the distance, and when a focal point adjusting state of the distance measuring point selected by a predetermined algorithm is not an in-focus state (step 109), the CPU 100 transmits a signal to the lens focal point adjusting circuit 110 to move the photographing lens 1 by a predetermined quantity (step 117). After moving the lens, the auto focal point detection circuit 103 again detects the focal point (step 107). Whether the photographing lens 1 is in or out of focus is judged (step 109).

Figure 11A:
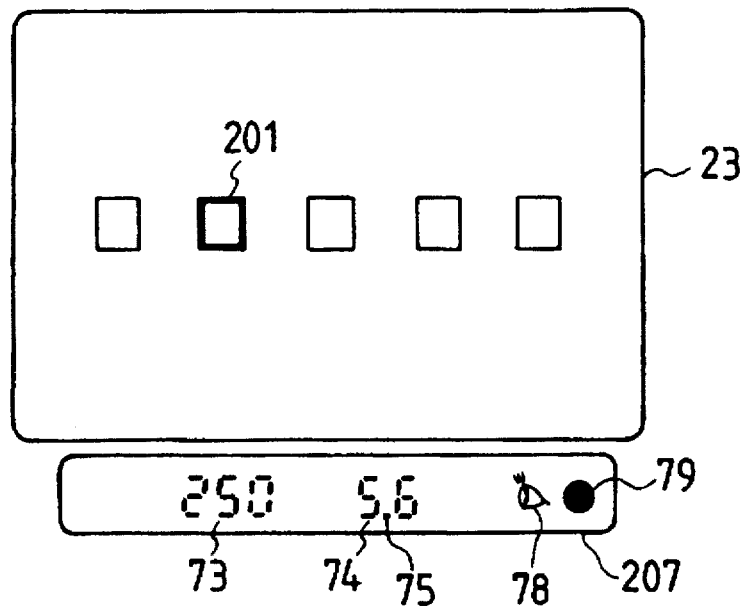
FIGS. 11A and 11B are views for explaining the actions of FIGS. 8A and 8B, similarly illustrating indications on the in-finder LCD.
Figure 11B:
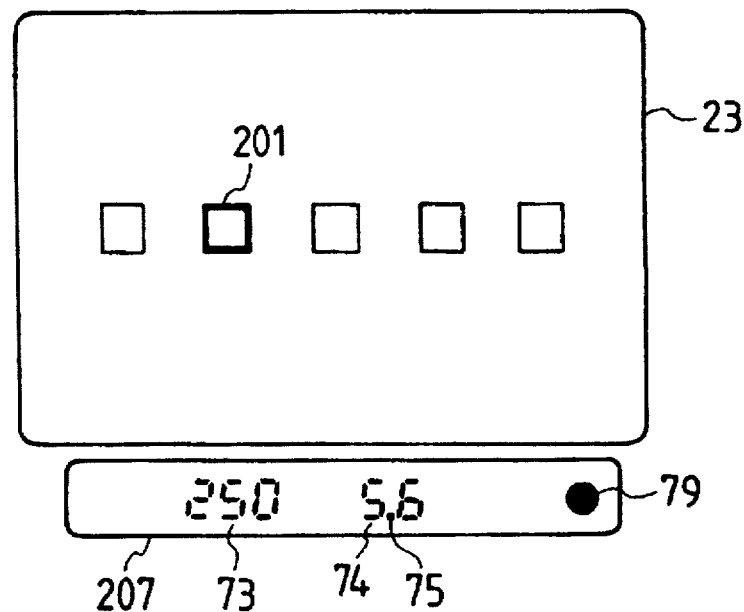

If the photographing lens 1 is in focus at a predetermined distance measuring point, as illustrated in FIG. 11A, the CPU 100 transmits a signal to the LCD drive circuit 105. The in-focus mark 79 of the in-finder LCD 24 is thereby lit up. At the same time, the signal is also transmitted to the LED drive circuit 106, whereby an in-focus indication is given at the in-focus distance measuring point 201 (step 110).

At this moment, the flickering indication of the distance measuring point selected based on the sight axis is extinguished. However, the distance measuring point with the in-focus indication often coincides with the distance measuring point selected based on the sight axis. Therefore, the in-focus distance measuring point is set in a lightin state for causing the photographer to make a recognition of being in focus. The photographer sees that the in-focus distance measuring point is displayed within the finder. The photographer, when recognizing that this distance measuring point is not correct, separates the hand from the release button 41. The switch SW1 is thereby turned off (step 111). Herein, the camera consecutively stands by till the switch SW1 is turned on (step 102).

Further, the photographer looks at the distance measuring point with the in-focus indication, and if consecutively the switch SW1 is kept on (step 111), the CPU 100 transmits a signal to the photometry circuit 102 to perform a photometric action (step 112). Calculated at this time is such an exposure value as to weight the photometry areas 210 to 213 including the in-focus distance measuring point.

In the case of this embodiment, there is performed a known photometric calculation in which the photometry area 210 including the distance measuring point 201 is weighted. As a result of this calculation, an f-number (F 5.6) is displayed by using the 7-segment portion 74 and the decimal point 75 (see FIG. 11A).

Herein, if the switch SW1 remains "on" by depressing the release button 41, the photometric action is conducted (step 112). The actions of steps 102 to 112 are repeated till the photometry timer comes to an end. There is an wait for a occurrence of a release interruption by turning on the switch SW2 (step 120).

When the interruption takes place by turning on the switch SW2 (step 120), the CPU 100 transmits signals to the shutter control circuit 108, the motor control circuit 109 and the aperture drive circuit 111, respectively.

More specifically, at the first onset, the motor M2 is energized to flip up the main mirror 2. The aperture 31 is stopped down, and, thereafter, the magnet MG1 is energized to make free the leading curtain of the shutter 4. An f-number of the aperture 31 and a shutter speed of the shutter 4 are determined from a sensitivity of a film 5 as well as from the exposure value detected by the photometry circuit 102. After a time of a predetermined shutter speed (e.g., ½₅₀ sec.) has elapsed, the magnet MG2 is energized to close the trailing curtain of the shutter 4. When finishing an exposure of the film 5, the next step is to energize the motor M2 once again. With a feed of film frames, a series of shutter release sequence actions are ended (step 151 in FIG. 9).

After the release action, if the switch SW1 still remains "on" (step 152), the photometry timer is reset (step 153). There is a wait for a release interruption till the time is ended while repeating the actions of steps 100 to 112. When the switch SW1 is turned off (step 152), it follows that the photometry time is switched off (step 154). The power supply is switched off through step 114 (step 115).

Next, a [sight axis detection] subroutine executed in step 104 will be explained with reference to FIGS. 12 and 13.

As discussed above, the sight axis detection circuit 101, when receiving the signal from the CPU 100, executes the detection of the sight axis (step 104). The sight axis detection circuit 101 judges whether to detect the sight axis in the photographing mode or in the calibration mode of the sight axis (step 201). Simultaneously, the sight axis detection circuit 101 recognizes which calibration data number to set the camera as will be mentioned later.

The sight axis detection circuit 101, when detecting the sight axis in the photographing mode, initially detects how the camera is posturized through the signal input circuit 104 (step 202). The signal input circuit 104 processes an output signal of the mercury switch 27 (SW-ANG) to detect a horizontal or vertical position the camera takes. If in the vertical position, for instance, whether the release button 41 is directed to the top or the bottom is judged. Subsequently, luminance information of the photographing area is obtained from the photometry circuit 102 via the CPU 100 (step 203).

Next, the infrared light emitting diodes (hereinafter abbreviated to IRED) 13a to 13f are selected from spectacle information of the photographer included in the calibration data as well as from information about the postures of the camera which have been detected beforehand (step 204). That is, when the camera is set in the horizontal position, and if the photographer does not wear the spectacles, the IREDs 13a, 13b closer to the finder optical axis shown in FIG. 2B are selected.

Further, when the camera is in the horizontal position, and if the photographer wears the spectacles, the IREDs 13c, 13d apart from the optical axis of the finder are selected. At this time, some rays of the illumination light reflected by the spectacle of the photographer fall on portions other than the predetermined area on the image sensor 14 on which an image of the eye ball is projected. Hence, no obstacle is caused in analyzing the eye ball image.

Further, when the camera is postured in the vertical position, there may be selected such a combination of the IREDs 13a, 13e or the IREDs 13b, 13f that the eye ball of the photographer is illuminated with the light from underneath.

Next, an accumulation time of the image sensor 14 (hereinafter termed CCD-EYE) and illumination power of the IREDs are set based on the photometric information and the spectacle information of the photographer (step 205). The accumulation time of the CCD-EYE and the illumination power of the IREDs may also be set based on a value judged from a contrast, etc. of the eye ball image obtained when detecting the sight axis the previous time.

When the accumulation time of the CCD-EYE and the illumination power of the IREDs have been set, the CPU 100 works to light up the IREDs with predetermined power through the IRED drive circuit 107. At the same time, the sight axis detection circuit 101 starts the accumulation of the CCD-EYE (step 206).

Further, the CCD-EYE finishes the accumulation in accordance with the accumulation time of the CCD-EYE set previously. Concurrently, the IREDs are extinguished. Then, if not in the calibration mode of the sight axis (step 207), a read area of the CCD-EYE is set (step 208).

Excepting the earliest detection of the sight axis after switching on the power supply of the camera body, a read area of the CCD-EYE is set based on the read area of the CCD-EYE when detecting the sight axis the previous time. However, if the posture of the camera changes, or if a condition of existence or non-existence of the spectacles changes, the read area of the CCD-EYE is set to a whole area.

When the read area of the CCD-EYE has been set, a reading action from the CCD-EYE is executed (step 209). At this time, areas other than the read area undergo a nonprocess reading action. As a matter of fact, the reading action skips over these areas. An output of the image read out of the CCD-EYE is subjected to an A/D conversion in the sight axis detection circuit 101 and thereafter stored in the CPU 100. Calculations for sampling of the respective characteristic points of the eye ball image are conducted in the CPU 100 (step 210).

More specifically, the CPU 100 detects positions (xd', yd'), (xe', ye') of Purkinje images defined as virtual images of a pair of IREDs used for illuminating the eye ball 15. The Purkinje images appear to exhibit a luminance with a high light intensity. Hence, a predetermined threshold value for the light intensity is provided. Those having a light intensity greater than the threshold value may be conceived as Purkinje images, thus making the detection possible.

Besides, calculating a central position (xc', yc') of a pupil 19 involves the steps of detecting a plurality of boundary points between the pupil 19 and an iris 17 and effecting a least squares approximation of the circle on the basis of the respective boundary points. At this time, a pupil diameter rp is also calculated. Further, a spacing between the two Purkinje images is calculated from the positions of these two Purkinje images.

The CPU 100 analyzes the eye ball image and simultaneously detects a contrast of the eye ball image. The accumulation time of the CCD-EYE is reset depending on a degree of the contrast thereof.

In addition, the read area of the CCD-EYE is set from the positions of the Purkinje images and of the pupil 19. At this time, the read area of the CCD-EYE is set within a range, including the detected pupil 19, in which the whole pupil is detectable even when the pupil 19 changes by a predetermined quantity. Then, a size thereof is, as a matter of course, smaller than a size of the iris.

The read area of the CCD-EYE is set as a rectangle. Coordinates of two diagonal points of the rectangle are stored as a read area of the CCD-EYE in the sight axis detection circuit 101. Further, the reliability on the calculated positions of the Purkinje images and of the center of the pupil are judged from the contrast of the eye ball image and from the size of the pupil 19.

When finishing the analysis of the eye ball image, the sight axis detection circuit 101 serving as a means for confirming the calibration data judges whether or not the spectacle information in the calibration data is correct from the combination of the IREDs lighted up as well as from the calculated spacing between the Purkinje images (step 211). This is intended for correspondence to the photographer who wears the spectacles or does not as the case may be.

That is, the photographer's spectacle information in the calibration data is set to, for instance, use the spectacles, and the IREDs 13c, 13d among those shown in FIG. 2B are lit up. In this case, the spacing between the Purkinje images is larger than a predetermined size, it is recognized that the photographer wears the spectacles. It is judged that the spectacle information is correct.

Whereas if the spacing between the Purkinje images is smaller than the predetermined size, it is recognized that the eyes of the photographer are naked or fitted with contact lenses. A judgement is that the spectacle information is incorrect. When the spectacle information is judged to be incorrect (step 211), the sight axis detection circuit 101 modifies the spectacle information (step 217). The IREDs are re-selected (step 204) to execute the detection of the sight axis. However, when modifying the spectacle information, the items of the spectacle information stored in the EEPROM 100a of the CPU 100 remain unchanged.

Further, when the spectacle information is judged to be correct (step 211), a distance between the eyepiece 11 and the eye ball 15 of the photographer is calculated from the spacing between the Purkinje images. Moreover, an imageforming magnification β of the eye ball image projected on the CCD-EYE is calculated from the distance between the eyepiece 11 and the eye ball 15 of the photographer (step 212). Based on the thus calculated values, a rotational angle θ of the optical axis of the eye ball 15 is, when modifying the formula (3) stated earlier, expressed such as (step 213):

$$\theta x \approx ARCSIN \{xc'-(xp'+\delta x)/\beta/L_{oc}\} \quad (6)$$

$$\theta y \approx ARCSIN \{yc'-(yp'+\delta y)/\beta/L_{oc}\} \quad (7)$$

however, $$xp' \approx (xd'+xe')/2$$

$$yp' \approx (yd'+ye')/2$$

where δx, δy are the correction terms for correcting the central positions of the two Purkinje images.

After the rotational angles θx, θy of the eye ball 15 of the photographer have been obtained, a position (x, y) of the sight axis on the imaging plate 7 is, when modifying the formula (5) described above, given by (step 214):

$$x=m[\{\theta x-(cx*rp+dx)\}/(ax*rp+bx)] \quad (8)$$

$$y=m\{\theta y-(cy*rp+dy)\}/by) \quad (9)$$

where ax, bx, by are the parameters for correcting an individual difference in the sight axis, and ax is the calibration data.

Further, bx corresponds to a correction quantity between the sight axis and the optical axis of the eye ball 15 in the horizontal direction (x-direction) and is expressed such as:

$$bx=kx*(rp-rx)+b0x \quad (10)$$

where, bx being a function of the pupil diameter rp of the photographer, rx is the constant, and box is the calibration data.

Additionally, a proportional coefficient kx relative to the pupil diameter rp in the foregoing formula (10) takes different values depending on the brightness and is set such as:

when $rp \geq rx$, $kx=0$ and, when $rp<rx$, $$kx=\{1-k0*k1*(\theta x+bx')/k0\}*k0 \quad (11)$$

Namely, the proportional coefficient kx takes a value [0] if the pupil diameter rp is greater than the predetermined brightness rx. Whereas if smaller than predetermined the brightness rx, the proportional coefficient kx becomes a function of the rotational angle θx of the optical axis of the eye ball 15.

Further, bx' corresponds to a correction quantity of the sight axis when the photographer looks at substantially the center of the finder and is given by:

$$bx'=k0*(rp-rx)+b0x$$

where k0 is the calibration data and expresses a rate of variations in the correction quantity bx of the sight axis with respect to variations in the brightness rp when the photographer looks at substantially the center of the finder. Besides, k1 is the predetermined constant.

In addition, by corresponding to a correction quantity in the perpendicular direction (y-direction) by is expressed such as:

$$by = ky^* rp + b0y \qquad (12)$$

where, by being a function of the pupil diameter of the photographer, ky and b0y are the calibration data. A method of obtaining the above-mentioned calibration data of the sight axis will be explained later.

Further, the reliability on the sight axis coordinates calculated by use if the formula (8) to (12) is changed in accordance with the reliability of the calibration data of the sight axis. When the coordinates of the sight axis on the imaging plate 7 have been obtained, there is set a flag (n=1) showing that the sight axis is detected once (step 215). The action returns to a main routine (step 218).

Figure 12:
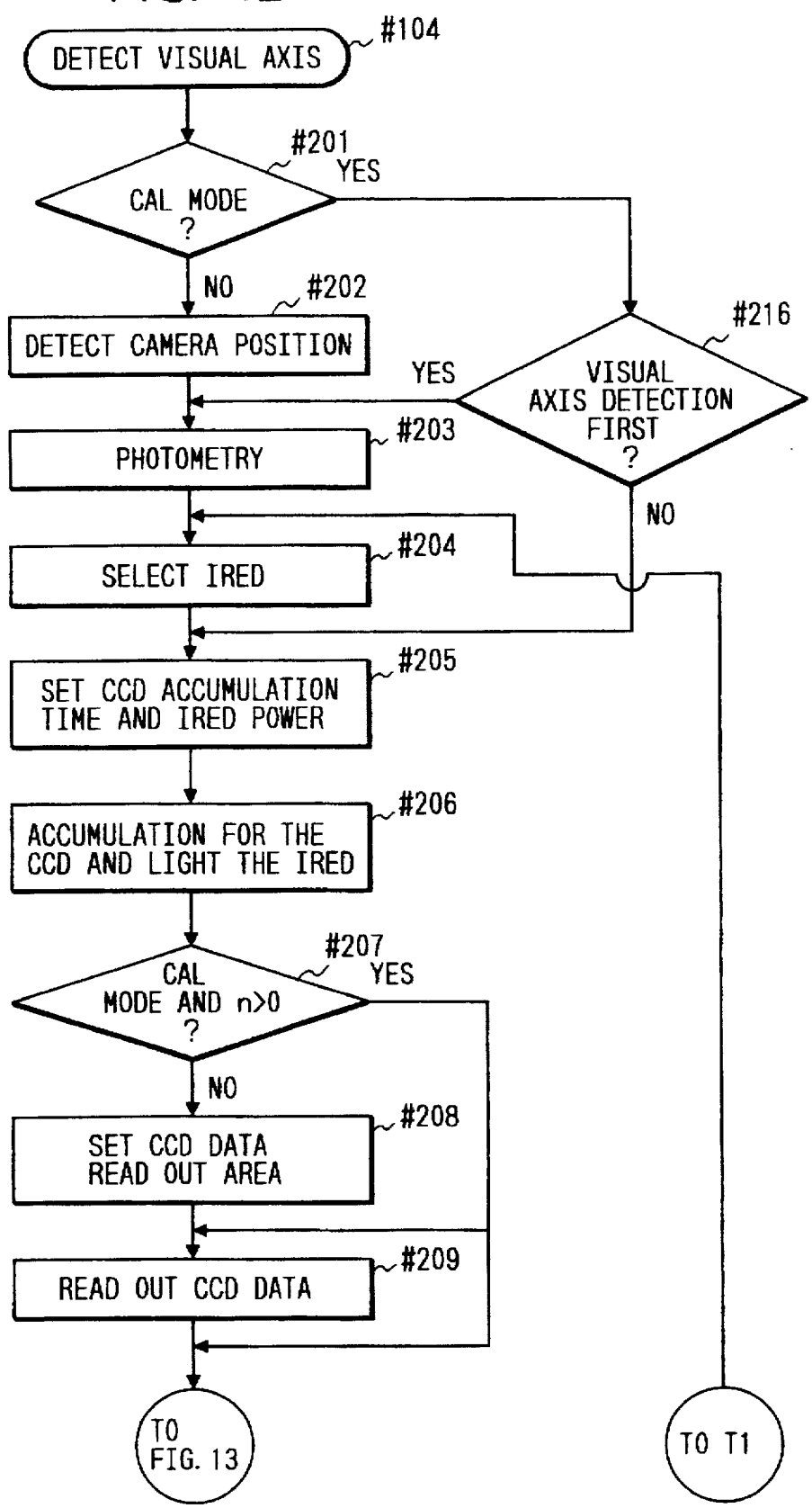
FIG. 12 is a flowchart showing some of the actions of a [sight axis detection] of FIGS. 8A and 8B.
Figure 13:
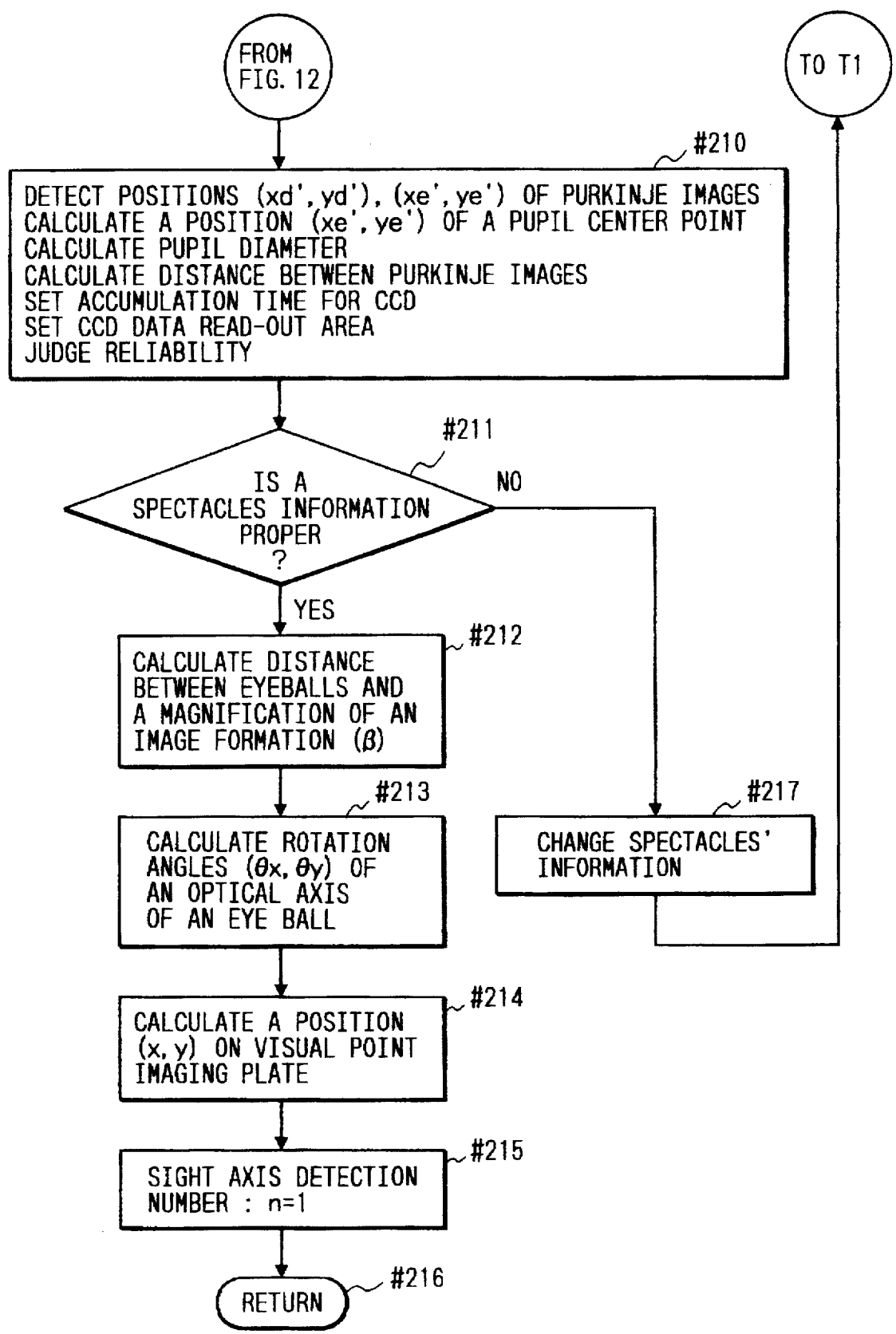
FIG. 13 is a flowchart showing actions continued from those of FIG. 12.

Besides, the flowcharts of FIGS. 12 and 13 each showing how the sight axis is detected are effective even in the calibration mode of the sight axis. That is, it is judged in step 201 that the sight axis is detected in the calibration mode. Judged next is whether or not the sight axis detection of this time is the first in the calibration mode (step 216).

If the sight axis detection of this time is judged to be the first in the calibration mode, an ambient brightness is measured to set the accumulation time of the CCD-EYE and the illumination power of the IREDs (step 203). The actions subsequent thereto are the same as the above-mentioned actions.

In addition, if the sight axis detection of this time is judged to be the second or larger in the calibration mode (step 216), the accumulation time of the CCD-EYE and the illumination power of the IREDs take the previous values. Started immediately are the light-up of the IREDs and the accumulation of the CCD-EYE (step 206).

Besides, if in the calibration mode of the sight axis, and when the number of sight axis detections is 2 or larger (step 207), the same area as the last time is employed as a read area of the CCD-EYE. Accordingly, immediately after finishing the accumulation of the CCD-EYE, the reading action from the CCD-EYE is executed (step 209). The actions subsequent thereto are the same as the above-mentioned actions.

Note that in the flowcharts of FIGS. 12 and 13 showing how the sight axis is detected, variables when returning to the main routine are the coordinates (x, y) of the sight axis on the imaging plate when normally detecting the sight axis. In the case of the sight axis detection in the calibration mode of the sight axis, however, the variables are the rotational angles ($\theta x$, $\theta y$) of the optical axis of the eye ball of the photographer. Besides, other variables, i.e., the reliability on the detected result, the CCD-EYE accumulation time and the CCD-EYE read area, are common.

Further, in accordance with this embodiment, the photometry information detected by the photometry sensor 10 of the camera is utilized to set the CCD-EYE accumulation time and the IRED illumination power. However, a means for detecting a brightness of a front facial part of the photographer is newly provided in the vicinity of the eyepiece 11, and it is also effective to utilize a value thereof.

Figures 14, 14A:
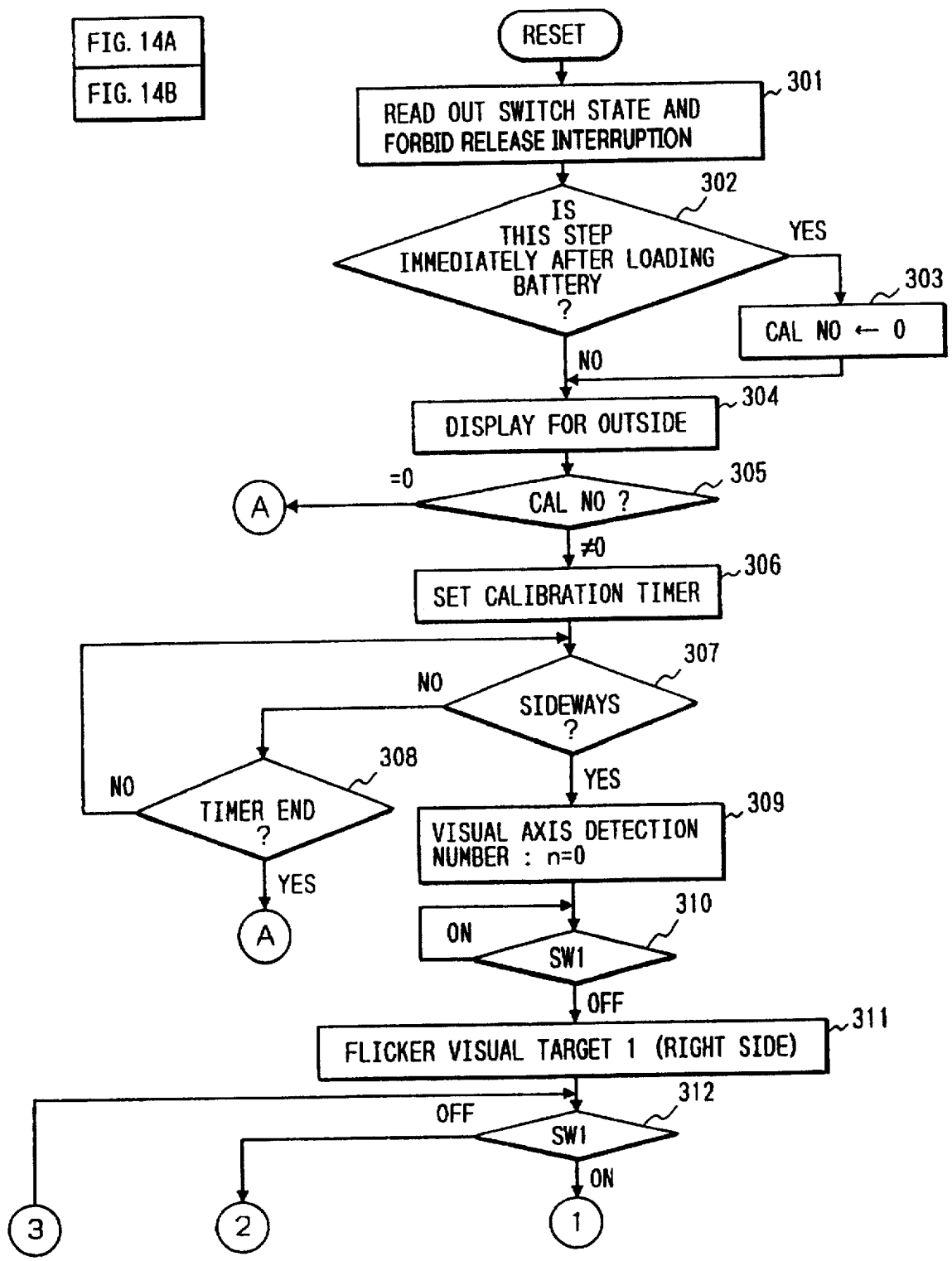
FIG. 14 is comprised of FIGS. 14A and 14B which are flowcharts showing some of the actions during a calibration mode of the single-lens reflex camera of FIG. 1.
Figure 14B:
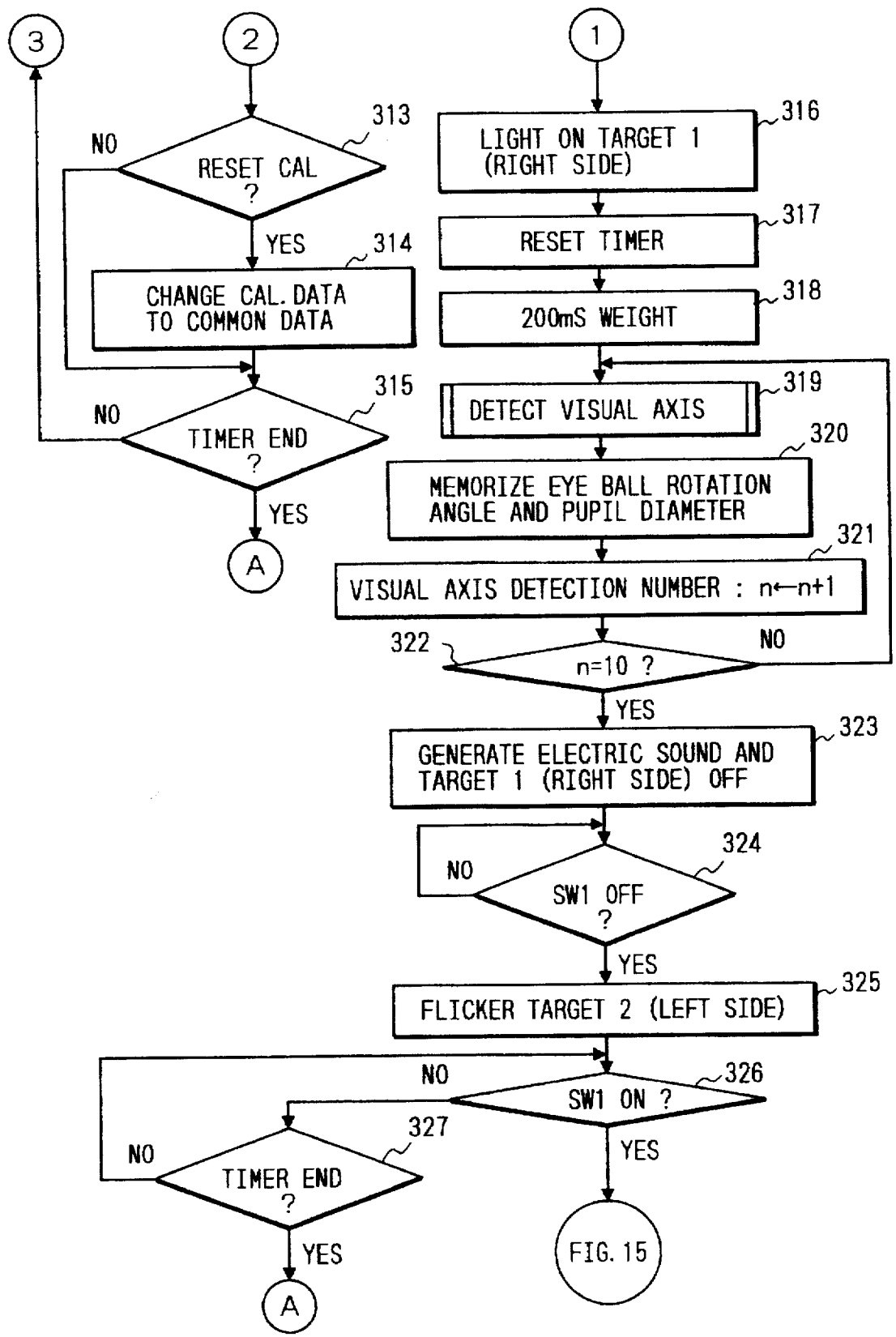
Figure 15:
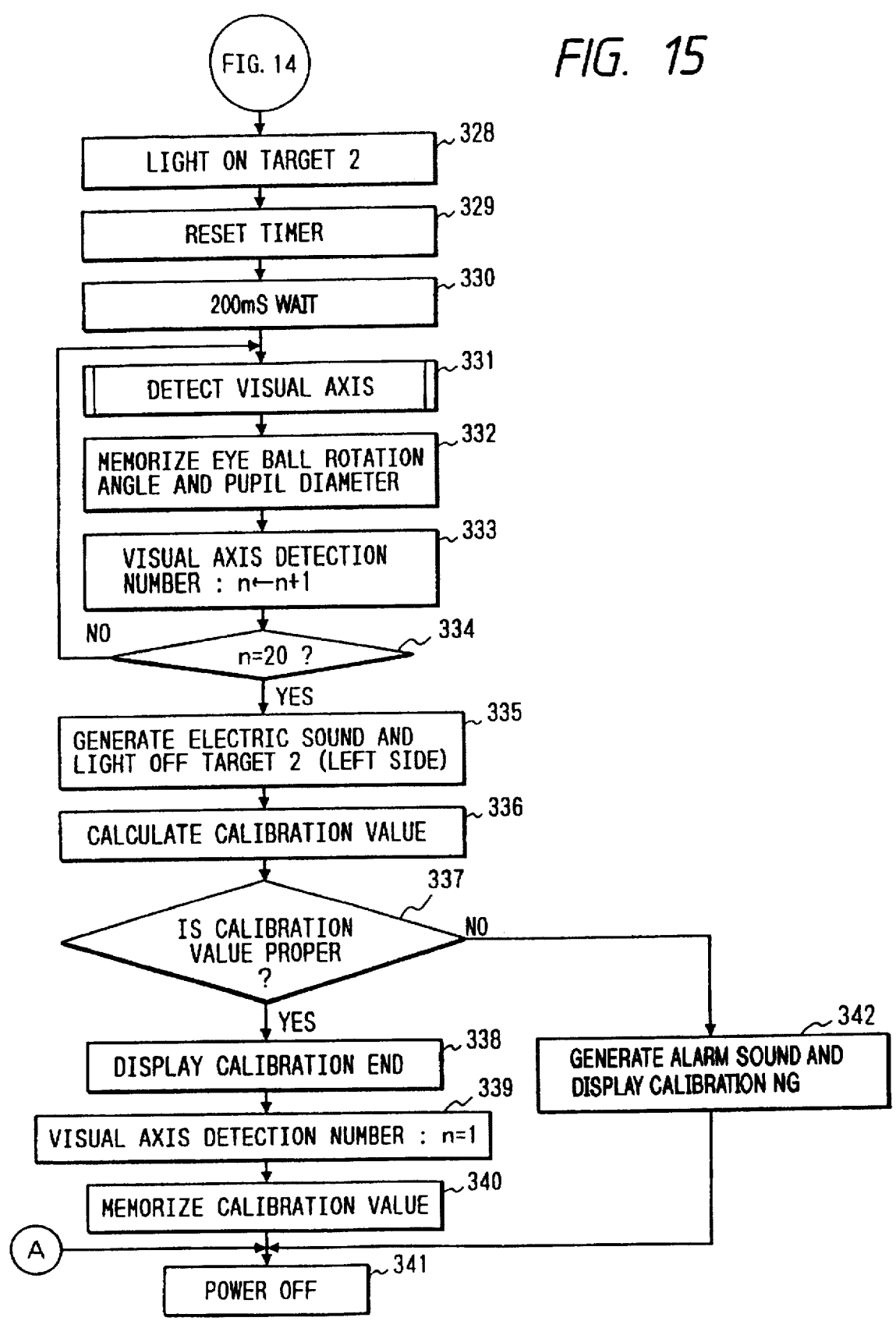
FIG. 15 is a flowchart showing actions continued from those of FIGS. 14A and 14B.

Next, the actions in the calibration mode will be explained with reference to FIGS. 14A, 14B, and 15 while seeing the indications on the in-finder LCD 24 and the monitor LCD 42 during the calibration of the sight axis shown in FIGS. 16A through 21B.

The calibration data of the sight axis corresponding to the pupil diameter rp are calculated by detecting the sight axis when the photographer gazes two visual targets (dot marks 205, 206 in FIG. 3).

The photographer rotates the mode dial 44 to adjust a [CAL] position 44d to the index 55. The CPU 100, when the reset is canceled by switching on the power supply, reads a state of each switch from the signal input circuit 104. The release interruption is herein inhibited, and, thereafter, the action does not shift to releasing during the calibration mode (step 301). Next, whether or not the battery has been switched on is judged (step 302). If turned on, the calibration number is rewritten to "0" (step 303).

Next, the signal input circuit 104 transmits a signal to the LCD drive circuit 105 via the CPU 100. The monitor LCD 42 gives an indication of having entered any one of the sight axis calibration modes which will be mentioned later (step 304).

Herein, FIG. 22 shows initial values and items of the calibration data stored in the EEPROM 100a of the CPU 100. The data actually stored in the EEPROM 100a of the CPU 100 are surrounded by bold lines in FIG. 22 Such data are the calibration data numbers set presently and plural items of calibration data managed by these numbers. Herein, the calibration data number "0" is conceived as a mode for inhibiting the detection of the sight axis.

Further, the above-described sight axis calibration data are stored on addresses of the EEPROM 100a which correspond to the calibration data numbers "1" to "5" (five items of data can be stored for an explanation in the embodiment, however, the data may be, as a matter of course, set in any manners).

The initial values of the calibration data are so set as to calculate the sight axis with standard eye ball parameters. Moreover, the initial values thereof include flags indicating whether or not the photographer uses the spectacles and a degree of the reliability on the calibration data. An initial value of the flag showing the existence or non-existence of the spectacles is set to [1] for exhibiting the use of spectacles. Further, an initial value of the flag showing the reliability of the calibration data is set to [0] for exhibiting non-reliability.

Figure 16A:
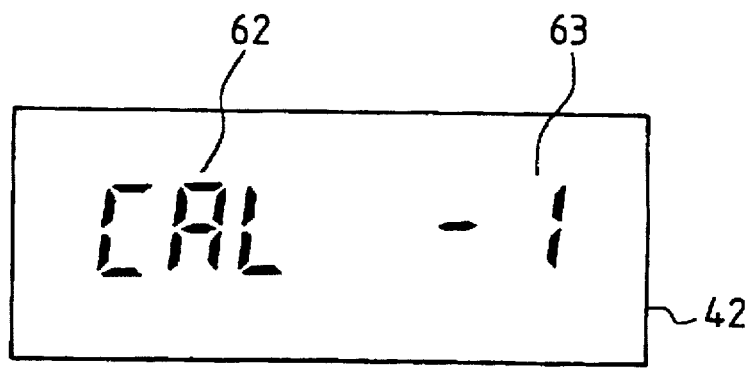
FIGS. 16A, 16B and 16C are views showing indications on the monitor LCD when setting calibration numbers in this embodiment.
Figure 16B:
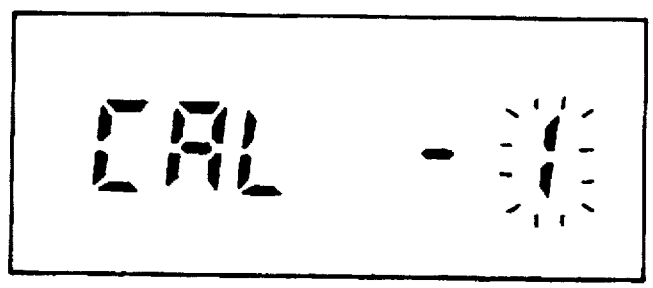

Further, the presently set calibration mode is, as shown in FIG. 16A, set in the monitor LCD 42. The calibration mode is classified into an "ON" mode to perform the calibration and an "OFF" mode to perform no calibration.

Firstly in the "ON" mode, calibration numbers "CAL-1" to "CAL-5" are prepared corresponding to the calibration data numbers "1" to "5". These calibration numbers are indicated by use of the 7-segment portion 62 for displaying a shutter speed and the 7-segment portion 63 for displaying an f-number. All other items in the fixed segment display portion 42a are extinguished (an example of the data number "1" is shown by way of the embodiment, and only this display portion is illustrated in enlargement).

At this time, the calibration data of the set calibration number takes the initial value. In this instance, the calibration number displayed on the monitor LCD 42 is flickered (see FIG. 16B). On the other hand, a calibration which will hereafter be stated has already been effected with respect to the set calibration number. If a calibration data number different from the initial value exists on the address of the EEPROM 100a which corresponds to the calibration data number, the calibration number displayed on the monitor LCD 42 is fully lit up (see FIG. 16A).

As a result, the photographer is capable of recognizing whether or not each of the presently set calibration numbers has already included the calibration data. The initial value of the calibration data number is also set to "0". The arrangement is such that if the sight axis calibration is not executed, the sight axis information is not inputted.

Figure 16C:
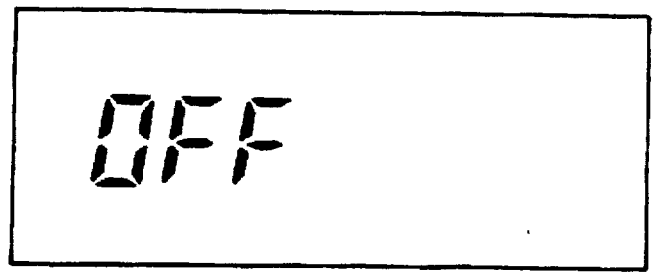

Next in the "OFF" mode, the 7-segment portion 63 indicates "OFF" (see FIG. 16C). The calibration data number "0" is always selected, and the sight axis inhibiting mode is set. This can be effectively utilized in, for instance, the following photographing conditions:

1) Conditions where the sight axis can not be detected as in the case of the eye ball being illuminated with an intensive rays of light like the solar light and of viewing an extremely bright scene like a mountain covered with snow and sandy beach in fine weather;
2) Conditions where the control can not be done, or the control contradictory to an intention of the photographer is done as in the case of a principal subject existing in the picture peripheral portion outside the distance measuring points and of viewing a background for a short while to set a composition; and
3) Conditions where a malfunction takes place due to a mistake in terms of a position for detecting the sight axis because of a difference of the calibration data as in the case of having a photo taken immediately by someone as a memorial one. In these cases, it is desirable to inhibit the detection of the sight axis and select the photographing mode for controlling a photographing function without using the sight axis information.

Referring back to FIGS. 14A and 14B, the CPU 100 subsequently discriminates the calibration numbers (step 305). Herein, when the photographer rotates the electronic dial 45, as discussed earlier, the signal input circuit 104 (detecting the rotation thereof with the aid of the pulse signal transmits a signal) to the LCD drive circuit 105 via the CPU 100. As a result, there varies the calibration number displayed on the monitor LCD 42 in synchronization with the rotation of the electronic dial 45. This situation is illustrated in FIG. 17.

To begin with, when rotating the electronic dial 45 clockwise, the calibration number changes such as: [CAL-1]→[CAL-2]→[CAL-3]→[CAL-4]→[CAL-5]. The photographer can make any desired one of five calibration numbers retentive of the calibration data in a calibrating operation which will be stated later.

Figure 17:
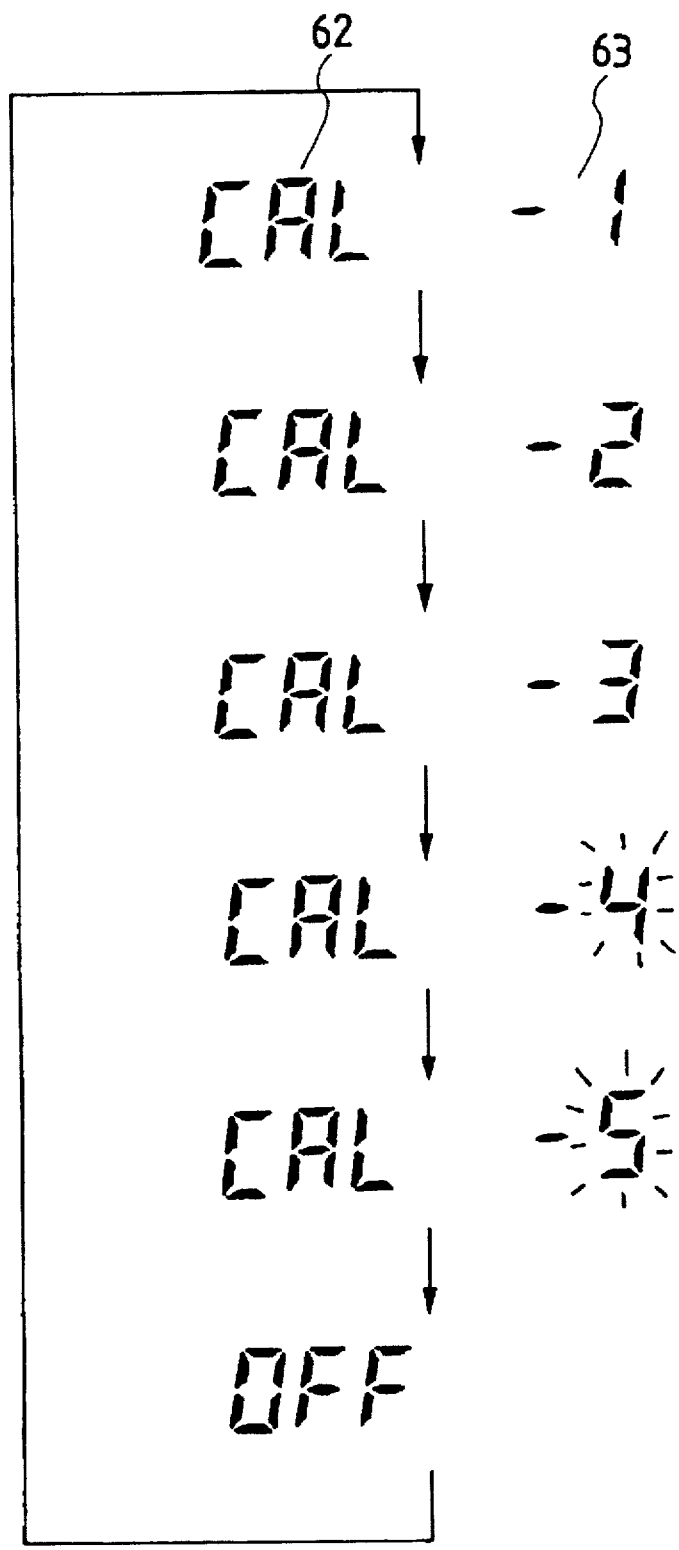
FIG. 17 is a view similarly showing an indication on the monitor LCD when setting the calibration numbers in this embodiment.
Figure 18A:
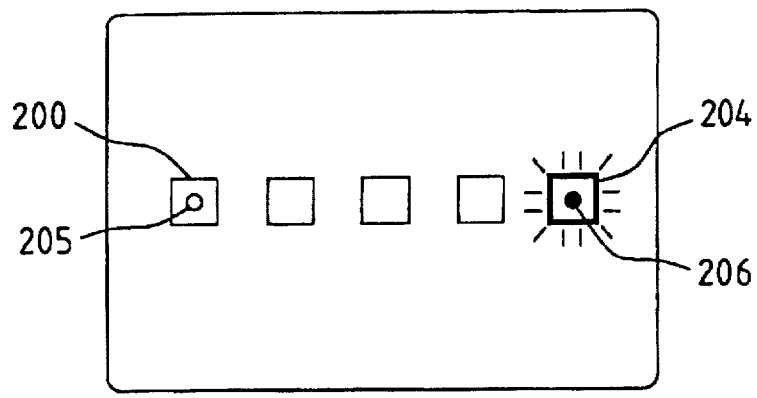
FIGS. 18A and 18B are views for explaining the actions of FIGS. 14A, 14B, and 15, illustrating indications on the in-finder LCD.
Figure 18B:
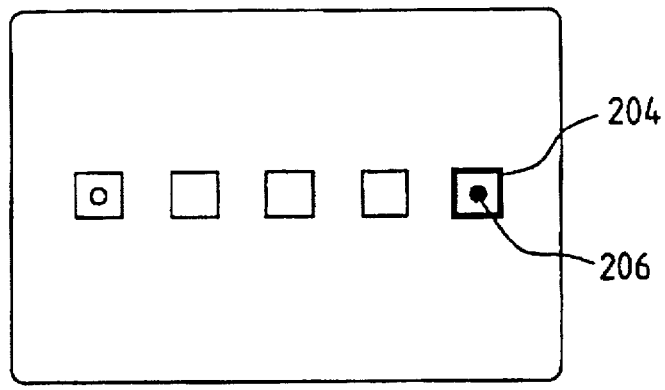
Figure 19A:
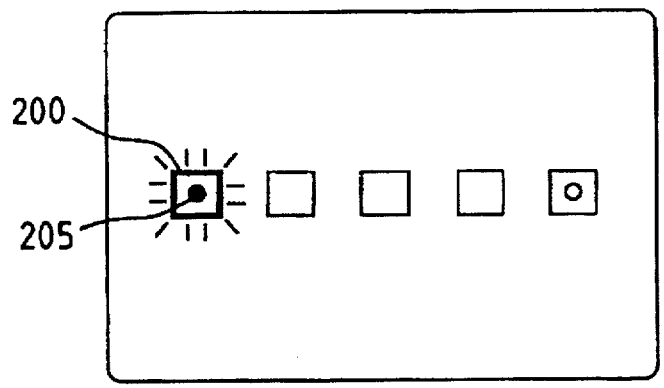
FIGS. 19A and 19B are views for explaining the actions of FIGS. 14A, 14B, and 15, similarly illustrating indications on the in-finder LCD.
Figure 19B:
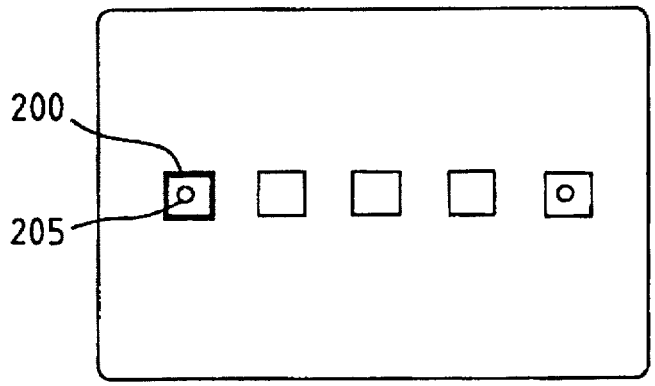

Then, FIG. 17 illustrates such a state that the calibration numbers [CAL-1, CAL-2, CAL-3] have already contained the calibration data, whereas [CAL-4, CAL-5] do not contain the data but remain initial values.

Next, when further rotated one click clockwise, an indication of "OFF" is given, whereby the sight axis inhibition mode comes. When rotated one more click, the calibration number returns to [CAL-1]. The calibration numbers are thus cyclically displayed. When rotated counterclockwise, the calibration numbers are displayed in just reverse to the direction shown in FIG. 17.

The photographer thus selects a desired calibration number while seeing the calibration numbers displayed on the monitor LCD 42. Thereafter, as stated above, the sight axis detection circuit 101 confirms a calibration data number corresponding thereto through the signal input circuit 104 (step 305). The confirmed calibration data number is stored in the EEPROM 100a. This calibration data number serves as data for determining which individual difference correction data of the calibration data to use during normal photography.

If the confirmed calibration data number is not modified, however, the EEPROM 100a does not execute the storage of the calibration data number. Herein, when the calibration data number is "0", the calibration is not conducted, and, therefore, the action proceeds to step 341. The power supply is switched off.

When the calibration number is set to any one of "1" through "5", the calibration is carried out. At this moment, if the photographer leaves the camera as it is in the course of the calibration, the power supply remains "on". Thereupon, a calibration timer is set for preventing the battery from being consumed fast (step 306). This timer is set longer than the photometry time during the normal photography. This is intended to prevent the timer from coming to an end while lingering over the calibration because of the photographer being unaccustomed thereto.

If the calibration data number is set to values other than "0" (step 306), the CPU 100 consecutively detects a posture of the camera through the signal input circuit 104 (step 307). The signal input circuit 104 judges whether the camera is in a horizontal or vertical position by processing the output signal of the mercury switch 27. When in the vertical position, whether the release button 41 is directed to, e.g., the top or the bottom is judged.

Figure 20A:
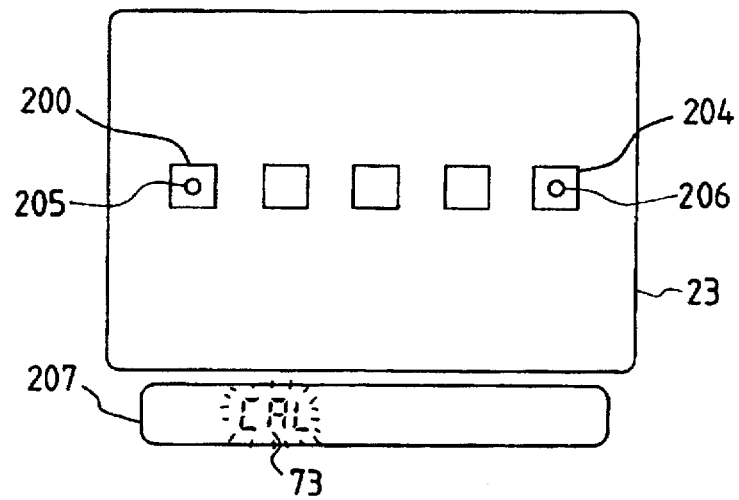
FIGS. 20A and 20B are for explaining the actions of FIGS. 14A, 14B, and 15, similarly illustrating indications on the in-finder LCD.
Figure 20B:
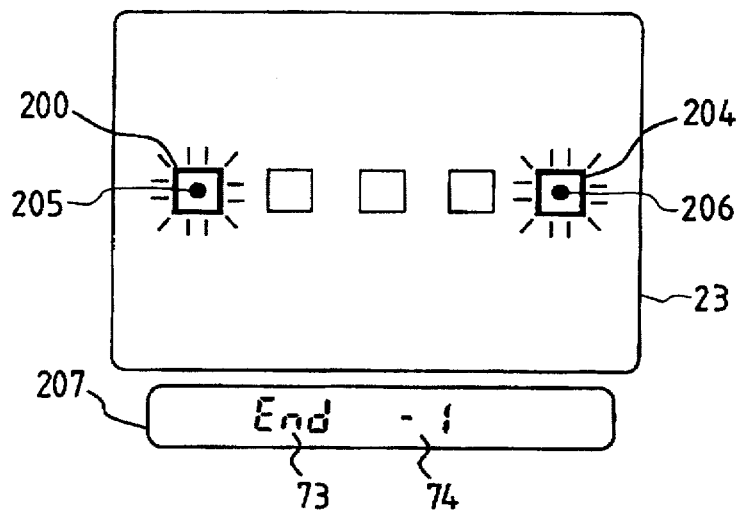
Figure 21A:
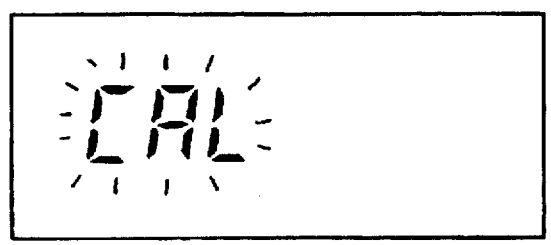
FIGS. 21A and 21B are for explaining the actions of FIGS. 14A, 14B, and 15, similarly illustrating indications on the in-finder LCD.
Figure 21B:
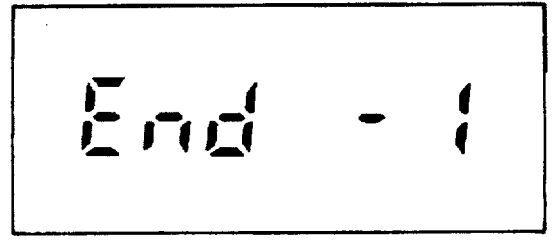
Figure 23:
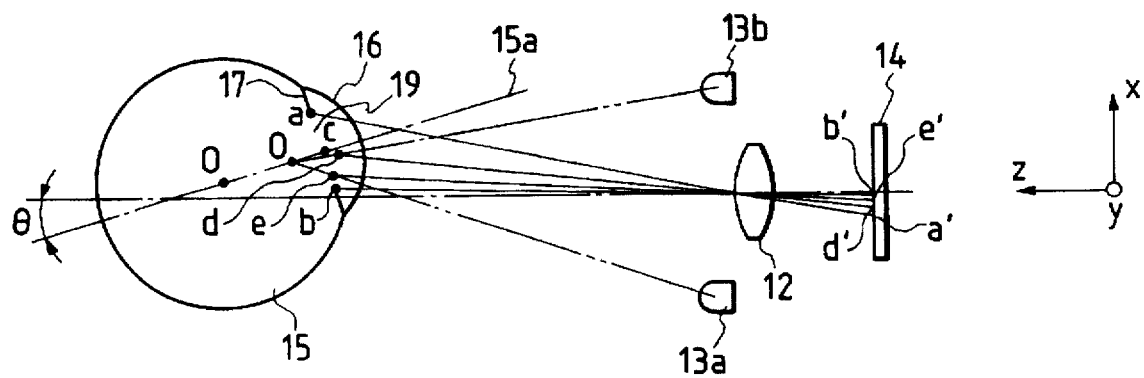
FIG. 23 is an explanatory view showing a typical method of detecting a sight axis.
Figure 24A:
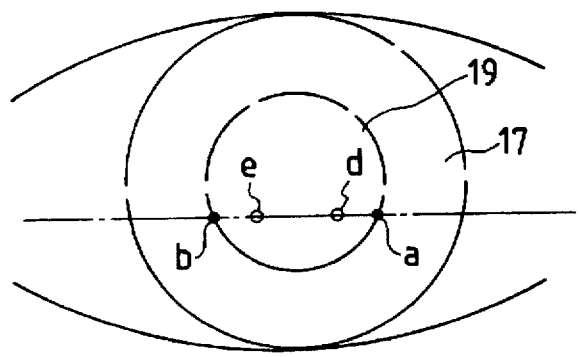
FIGS. 24A and 24B are explanatory views similarly showing a typical method of detecting the sight axis.
Figure 24B:
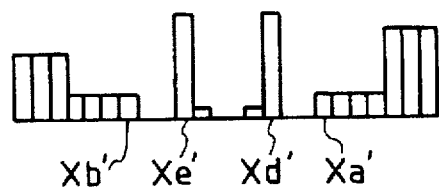

The camera is often used generally in the horizontal position. Accordingly, the hardware for effecting the calibration of the sight axis is also constructed to make the calibration possible when the camera is postured in the horizontal position. With this construction, when the CPU 100 informs the sight axis detection circuit 101 of the fact that the camera is not posturized in the horizontal position, the photographer at first receives an alarm saying that the calibration of the sight axis can not be done. Thereupon, as illustrated in FIG. 20A, the [CAL] indication is flickered on the in-finder LCD 24 provided in the finder of the camera. At this time, an alarming sound may be given from the unillustrated sounding unit. Then, when the calibration timer has finished (step 308), the power supply is switched off (step 341).

On the other hand, when detecting that the camera is postured in the horizontal position (step 307), the sight axis detection circuit 101 sets a sight detection number n to [0] (step 309). At this time, when the [CAL] indication is flickered on the in-finder LCD 24, the photographer is to gaze at this flickering.

For preventing the calibration on the camera side before the photographer makes the preparations for the calibration of the sight axis, the sight axis detection circuit 101 confirms a state of the switch SW1. When the switch SW1 is brought into an ON-state by depressing the release button 41, there is a wait till the switch SW1 comes to an OFF-state (step 310).

The sight axis detection circuit 101, when confirming that the switch SW1 is in the OFF-state through the signal input circuit 104 (step 310), transmits a signal to the LED drive circuit 106. The visual target for the calibration of the sight axis is thereby flickered (step 311). The visual target for the calibration of the sight axis partly serves as a distance measuring point mark so that the photographer can smoothly perform the calibration which will be mentioned below while being guided by superimpose indications. At the first onset, the distance measuring point mark 204 and the dot mark 206 at the right end are flickered (see FIG. 18A).

Then, if there is not inputted an ON signal of the switch SW1 which is defined as a trigger signal for starting the calibration of the sight axis, the camera stands by (step 312).

At this time, when the photographer simultaneously depresses the AE lock button 43 and the CAL reset button 60 (step 313), the calibration data are reset. The calibration is effected in a certain calibration number, and when the individual difference correction data are stored in the EEPROM 100a, the originally existing common data are stored in other address. This reset action is therefore intended to return the individual difference correction data to common data (step 314).

That is, when the camera is lent to someone for a short time to have a photo taken, it is very time-consuming to take trouble to perform the calibration. Therefore, it may be more convenient for inputting the sight axis with the common data. This is a function on that occasion.

Then, if the calibration timer is finished (step 315), the power supply is switched off (step 341). Whereas if not yet finished, there must be a wait till the switch SW1 is turned on in a loop such as: step 312→step 313→step 314→step 315.

Further, the photographer gazes at the visual target when flickering is started and depresses the release button 41 to turn on the switch SW1 (step 312). Then, the sight axis detection circuit 101 causes the LED drive circuit 106 to fully light up the visual target 1 (see FIG. 18B) (step 316). Subsequently, the calibration timer is reset (step 317). If the camera is left as it is for a given period from that point of time, the power supply is to be turned off for saving the energy. Then, a wait on the order of 200 ms is set herein (step 318), and the detection of the sight axis is executed (step 319). The sight axis is detected as explained in the flowchart of FIG. 12. Incidentally, the following is the reason why the wait on the order of 200 ms is set in step 317. Even when the photographer is not accustomed to effect the calibration, the switch SW1 is turned on by depressing the release button 41 just before gazing at the visual target. Thereupon, it follows that the visual target information before gazing is taken. It is considered that the accurate individual difference correction data can not be calculated.

Herein, the dot marks 205, 206 are, as explained before, inscribed in the distance measuring point mark 204 at the right end and the distance measuring point mark 200 at the left end in FIG. 20A. This implies that the calibration is conducted in positions of these two points. Both of the dot marks can be indicated in non-lighting then and flickering as the superimpose LEDs illuminate them with the light. Further, the distance measuring point marks indicate areas for detecting the focal point, and hence area indications corresponding to these areas are needed.

It is, however, required that the photographer should gaze at one point to the greatest possible degree for performing the calibration with a high accuracy. The dot marks 205, 206 are formed smaller than the distance measuring point marks so that the photographer easily gazes at one point. The sight axis detection circuit 101 stores the reliability on the respective items of data, the pupil diameter rp and the rotational angles θx, θy of the eye balls which are defined as variables from the subroutine for detecting the sight axis (step 320).

Furthermore, the sight axis detection number n is counted up (step 321). There is more or less a scatter in the sight axis of the photographer. Accordingly, the sight axis detection is executed a plurality of times with respect to one visual target in order to obtain the accurate calibration data of the sight axis. It is effective in making most of a mean value thereof. In accordance with this embodiment, the sight axis detection number is set to 5 with respect to one visual target. If the sight axis detection number n is not 10 (step 322), the sight axis detection continues (step 316).

If the sight axis detection number n is 10, there is finished the sight axis detection with respect to the visual target 1 (the distance measuring point mark 204 and the dot mark 206).

For making the photographer recognize that the sight axis detection with respect to the visual target 1 has been finished, the sight axis detection circuit 101 causes the unillustrated sounding unit to emit electronic sounds several times through the CPU 100. Concurrently, the sight axis detection circuit 101 causes the LED drive circuit 106 to extinguish the visual target 1 (step 323) (see FIG. 18B).

Consecutively, the sight axis detection circuit 101 confirms whether or not the switch SW1 is in the OFF-state through the signal input circuit 104 (step 324). When the switch SW1 is in the ON-state, the camera stands by till the switch SW1 is brought into the OFF-state. When the switch SW1 is in the OFF-state, a visual target 2 (the distance measuring point mark 200 and the dot mark 205) at the left end starts flickering (step 325) (see FIG. 19A).

The sight axis detection circuit 101 again confirms whether or not the switch SW1 is in the ON-state through the signal input circuit 104 (step 326). When the switch SW1 is in the OFF-state, and if the calibration has been finished (step 327), the power supply is switched off (step 341). Further, if the timer continues to operate, the camera stands by till the switch SW1 is turned on. When the switch SW1 is turned on, as in the same way with the visual target 1, the LED drive circuit 106 at first fully lights up the visual target 2 (see FIG. 19B) (step 328). The calibration timer is reset (step 329), and a wait on the order of 200 ms is set (step 330). Then, the sight axis detection is executed (step 331).

The sight axis detection circuit 101 stores the reliability on the respective items of data, the pupil diameter rp and the rotational angles θx, θy of the eye ball which are defined as variables from the subroutine for detecting the sight axis (step 332). Further, the sight axis detection number n is counted up (step 333). Moreover, if the sight axis detection number n is not 20 (step 334), the sight axis detection continues (step 331). If the sight axis detection number n is 20, there is finished the sight axis detection with respect to the visual target 2. For making the photographer recognize that the sight axis detection with respect to the visual target 2 has been finished, the sight axis detection circuit 101 causes the unillustrated sounding unit to emit the electronic sounds several times through the CPU 100. Concurrently, the sight axis detection circuit 101 causes the LED drive circuit 106 to extinguish the visual target 2 (step 335).

Then, when the sight axis detection number reaches 20, the calibration data of the sight axis is calculated from the rotational angles θx, θy of the eye ball and the pupil diameter rp stored in the sight axis detection circuit 101 (step 336). The following is an explanation of a method of calculating the calibration data of the sight axis.

Let (x1, 0), (x2, 0) be coordinates of the visual targets 1, 2 on the imaging plate 7. Let (θx1, θy1), (θx2, θy2) be mean values of the rotational angles (θx, θy) of the eye ball when gazing at the respective visual targets which are stored in the sight axis detection circuit 101. Let r1, r2 be mean values of the pupil diameters. However, (θx1, θy1) represent the mean value of the rotational angles of the eye ball which are detected when the photographer gazes at the visual target 1; and (θx2, θy2) denote the mean value thereof when gazing at the visual target 2.

The calibration data (ax, bx, cx, dx) of the sight axis in the horizontal direction (x-direction) are calculated such as:

ax=0 bx=m(θx1−θx2)/(x1−x2)

cx=0 dx=(θx1+θx2)/2

The calibration data (by, cy, dy) of the sight axis in the vertical direction (y-direction) are calculated by:

by=bx
cy=0
dy=θy=(θy1+θy2)/2

Further, the sight axis detection circuit 101 serves also as a means for judging the reliability of the calibration data. The sight axis detection circuit 101 judges whether the calculated calibration data of the sight axis are proper or not (step 337). The judgement is made by use of the calculated sight axis calibration data themselves as well as the reliability of the pupil diameter and the rotational angles of the eye ball which are defined as variables from the subroutine for detecting the sight axis.

Namely, if unreliable on the pupil diameter and the rotational angles of the eye ball which have been detected in the [sight axis detection] subroutine, the calculated calibration data of the sight axis are also judged to be unreliable. Further, if the pupil diameter and the rotational angles of the eye ball which have been detected in the sight axis detection subroutine are reliable, the calculated calibration data of the sight axis, when falling within a range of the general individual difference, are judged to be proper. While on the other hand, the calculated calibration data of the sight axis, when deviating largely from the range of the general individual difference, are judged to be improper.

Further, the sight axis detection circuit 101 judges not only whether or not the calculated calibration data of the sight axis are proper but also a degree of the reliability of the calculated calibration data of the sight axis. The degree of the reliability, as a matter of course, depends on the reliability on the pupil diameter and the rotational angles of the eye ball which have been detected in the sight axis detection subroutine. The reliability on the calibration data of the sight axis is digitized in 2 bits in accordance with the degree thereof. The digitized result is, as will be stated later, stored in the EEPROM 100a of the CPU 100.

If the calculated calibration data of the sight axis are judged to be improper (step 337), the sight axis detection circuit 101 causes the unillustrated sounding unit to emit electronic sounds different from those when detected for a predetermined time through the CPU 100, thus giving an alarm indicating that the sight calibration has ended up with a failure. At the same time, the sight axis detection circuit 101 transmits a signal to the LCD drive circuit 105. The [CAL] indications are thereby flickered on the in-finder LCD 24 and the monitor LCD 42 to give an alarm (step 344) (see FIGS. 20A and 21A).

Then, the power supply is switched off (step 341).

In addition, if the calculated calibration data of the sight axis are proper (step 337), the sight axis detection circuit 101 causes the LCD drive circuit 105 and the LED drive circuit 106 to indicate an end of the calibration of the sight axis (step 338).

The LED drive circuit 106 energizes the superimpose LED 21, whereby the visual targets 1, 2 are flickered several times. Simultaneously, the LCD drive circuit 105 transmits signals to the LCDs 24, 42, and an indication of [End-calibration No] is executed for a predetermined time (see FIGS. 20B and 21B).

The sight axis detection circuit 101 sets the sight detection number n to [1] (step 339). Stored further on the addresses of the EEPROM 100a are the calculated calibration data of the sight axis, the spectacle information of the photographer and the reliability of the calculated calibration data of the sight axis, these addresses corresponding to the presently set calibration data numbers (step 340). At this time, if the calibration data of the sight axis have already been stored on the addresses of the EEPROM 100a which is on the verge of storing the data, the calibration data are updated.

Besides, default data are, if already stored, stored in other addresses. The default data can be invoked again by resetting the calibration as discussed above.

When storing the calibration data, the power supply is switched off (step 341).

In this manner, during the calibration mode, the release interruption remains inhibited, and hence the release is not performed at all.

The embodiments discussed above exhibit the following effects.

1) When initially using the camera (immediately after switching on the battery), the camera is set in the sight axis inhibition mode. Therefore, a difficult operation such as the calibration is not required. The user can, though apart from the sight axis detecting function, get accustomed to the camera. It is possible to realize an easy-to-use camera in which the user can get accustomed stepwise to the sight axis detecting function.

2) When starting the action of the sight axis detection, the default data stored beforehand as a mean value of the eyes of thousands of people are employed without performing a relatively troublesome operation as in the calibration. Therefore, the sight axis can be detected accurately to some extent. The user therefore immediately gets accustomed to the detection of the sight axis. An execution of the next calibration can be smoothed, thereby making it possible to provide the easy-to-use camera.

3) During the calibration, the eye ball image projected on the image sensor is taken at an interval of a fixed time (200 ms in the embodiment) after turning on the switch SW1. The individual difference correction data are arithmetically obtained. The failure derived from being unaccustomed to the calibration is hereby eliminated. The calibration can be always effected accurately. A camera exhibiting an enhanced accuracy to detect the sight axis can be attained.

4) During the calibration, the shift to the release action is by no means effected. It is therefore feasible to realize an easy-to-use camera without mistakenly entering the exposure action to take an erroneous photo and giving any disagreeable impression.

5) During the calibration, the calibration time is constructed to operate, and, hence, there is no possibility that the battery will be used up soon due to a mistake in operation. An easy-to-use camera requiring a small amount of electric power can be provided.

6) The sight axis can be detected based on the default data with the reset function of the calibration data. Hence, it is possible to provide an easy-to-use camera effective in having a photo taken by lending the camera to someone for a short while.

As discussed above, according to the present invention, there is provided the photographing mode setting means for setting the sight axis inhibition photographing mode when in the initial state. In the initial state when switching on the power supply, the sight axis inhibition photographing mode is automatically set.

Hence, if the camera is used for the first time, the photography is practicable without performing a relatively troublesome operation for correcting the sight axis. It is possible to get the user accustomed stepwise to the photography utilizing the sight axis detecting function.

Further, according to the present invention, there are provided the second storage means for storing the general individual difference correction data and the control means. The control means controls the photographing function on the basis of the sight axis information given from the sight axis detecting means and the correction data stored in the second storage means when in the initial state in accordance with the sight axis photographing mode. The control means thereafter controls the photographing function on the basis of the sight axis information given from the sight axis detecting means and the correction data stored in the first storage means for storing the correction data calculated by the sight axis correcting means. Provided also are the second storage means for storing the general individual difference correction data, the reset means for returning the individual difference correction data to a general value and the control means. The control means controls the photographing function on the basis of the sight axis information given from the sight axis detecting means and the correction data stored in the second storage means when operating the reset means in the sight axis photographing mode. The control means also controls the photographing function on the basis of the sight axis information given from the sight axis detecting means and the correction data stored in the first storage means when the reset means is not operated. The individual difference correction data take the general values (default data) before correcting the sight axis or when operating the reset means.

Accordingly, it is possible to execute photography utilizing the sight axis detecting function which is accurate to some extent without effecting the relatively troublesome operation for correcting the sight axis.

Further, according to the present invention, there is provided the sight axis correcting means for starting the correction of the sight axis after a predetermined time has elapsed since the operation member (for causing the sight axis correcting means to start the correction of the sight axis) has been operated. The sight axis correcting means corrects the sight axis by calculating the individual difference correction data at an interval of a predetermined time from operating of the operation member.

Hence, even though unaccustomed to the operation to correct the sight axis, this operation can be accurately performed.

Further, according to the present invention, there is provided an operation member for causing the sight axis correcting means to start the correction of the sight axis. Provided also is the exposure inhibiting means for inhibiting the shift to the exposure action even when the release operation is conducted during the correction of the sight axis by the sight axis correcting means. The shift to the exposure action is thereby inhibited during the correction of the sight axis.

Accordingly, it is possible to prevent a failure in taking a photo due to the execution of the exposure effected mistakenly during the correction of the sight axis.

Further, according to the present invention, there is provided the power supply control means, started when the sight axis correcting means begins correcting the sight axis, for switching off the power supply when the operation member employed in the case of correcting the sight axis is not operated for a predetermined time. If the operation member employed in the case of correcting the sight axis is not operated for the predetermined time, the power supply is automatically switched off.

A careless consumption of the battery is thereby prevented from being induced during the correction of the sight axis.

It is apparent that, in this invention, a wide range of different working modes can be formed based on the invention without deviating from the spirit and scope of the invention. This invention is not restricted by its specific working modes except being limited by the appended claims.

What is claimed is:

1. An apparatus for use with a sight axis detection device and a detachable power supply, said apparatus comprising:
   forming means for forming information corresponding to a sight axis of a viewer of the apparatus;
   means for detecting that the power supply of the apparatus is switched on;
   setting means for setting a first control mode for controlling said apparatus on the basis of said information formed by said forming means, and a second control mode for controlling said apparatus without utilizing said information; and
   control means for causing said setting means to automatically set said second control mode after said power supply is detected as being switched on even when said setting means has set the first control mode.

2. The apparatus according to claim 1, wherein said power supply includes a battery.

3. The apparatus according to claim 1, wherein said apparatus comprises a camera.

4. The apparatus according to claim 3, wherein said first control mode includes a mode of executing an adjustment of a focal point of said camera with respect to an object corresponding to said information.

5. The apparatus according to claim 3, wherein said forming means uses data unique to the viewer when forming said information.

6. Apparatus according to claim 1, wherein said setting means comprise a switch for activating said apparatus.

7. Apparatus according to claim 6, further comprising a switch for activating said apparatus, said switch maintaining each of the set modes in a state where the apparatus is activated.

8. An apparatus for detecting a sight axis, comprising:
   forming means for forming information corresponding to a sight axis of a viewer of the apparatus;
   first storage means for storing correction data unique to the viewer and used for forming said information; and
   second storage means for storing correction data corresponding substantially to an average of unique correction data from a plurality of viewers and used for forming said information,
   wherein said forming means forms said information on the basis of correction data stored in said second storage means when correction data are not stored in said first storage means.

9. An apparatus for detecting a sight axis, comprising:
   forming means for forming information corresponding to a sight axis of a viewer of the apparatus on the basis of an image of an eye ball of the viewer;
   first storage means for storing correction data unique to the viewer and used for forming said information;
   second storage means for storing correction data corresponding to an average of unique correction data from a plurality of viewers and used for forming said information;
   an operation member; and
   means for deleting correction data stored in said first storage means when said operation member is operated.

10. An apparatus for detecting a sight axis, comprising:
    forming means for forming information corresponding to a sight axis of a viewer of the apparatus;
    calculating means for calculating correction data unique to the viewer and used for forming said information;

an operating means;

a timer for counting a predetermined time; and means for causing said calculating means to begin calculating the correction data only after the predetermined time has passed since said operating means was operated.

11. Optical apparatus for use with a detachable battery, comprising:

means for detecting that the battery is attached to the apparatus;

forming means for forming information corresponding to a sight axis of a viewer of the apparatus;

setting means for setting a first control mode for controlling said apparatus on the basis of said information formed by said forming means, and a second control mode for controlling said apparatus without using the information formed by said forming means; and control means for causing said setting means to automatically set said second control mode when said battery is detected as being attached by said means for detecting.

12. Apparatus according to claim 11, wherein said setting means comprise a switch for activating said apparatus.

13. Apparatus according to claim 12, further comprising a switch for activating said apparatus, said switch maintaining each of the set modes in a state where the apparatus is activated.

14. An apparatus for use with a sight axis detection device and a detachable power supply, said apparatus comprising:

forming means for forming information corresponding to a sight axis of a viewer of the apparatus;

means for detecting that the power supply of the apparatus is exchanged;

setting means for setting a first control mode for controlling said apparatus on the basis of the information formed by said forming means, and a second control mode for controlling said apparatus without utilizing the information; and control means for causing said apparatus to automatically set the second control mode after the power supply is detected as being exchanged, even when said setting means has set the first control mode, where said setting means can set the first control mode again, even in a state of the second control mode, after the power supply is exchanged.

* * * * *

UNITED STATES PATENT AND TRADEMARK OFFICE
CERTIFICATE OF CORRECTION

PATENT NO. : 5,717,959      Page 1 of 3
DATED : February 10, 1998
INVENTOR(S) : TATSUYUKI TOKUNAGA It is certified that error appears in the above-identified patent and that said Letters Patent is hereby corrected as shown below:

Line 30, "3-11492," should read --3-11492--;
    Line 31, "4-242630)" should read --4-242630),--; and
    Line 33, "photopraphy" should read --photography--.

COLUMN 3:

Line 53, "When" should read --When a--.

COLUMN 4:

Line 12, "to" (second occurrence) should be deleted;
    Line 13, "difficult may" should read --difficult.--;
    Line 14, "remarkably decline." should be deleted; and
    Line 37, "of the the" should read --of the other--.

COLUMN 8:

Line 1, "eyepieces" should read --eyepiece--;
    Line 2, "10" should be deleted;
    Line 14, "-state" should read --state--; and
    Line 26, "the" should read --to the--.

COLUMN 12:

Line 26, "comprising" should read --is comprised of--.

UNITED STATES PATENT AND TRADEMARK OFFICE
CERTIFICATE OF CORRECTION

PATENT NO. : 5,717,959
DATED : February 10, 1998
INVENTOR(S) : TATSUYUKI TOKUNAGA It is certified that error appears in the above-identified patent and that said Letters Patent is hereby corrected as shown below:

COLUMN 14:

Line 33, "Hereat," should read --Then,--.

COLUMN 15:

Line 13, "lightin" should read --lighting--; and
    Line 38, "is an" should read --is a-- and "for a" should read --for an--.

COLUMN 16:

Line 10, "posturized" should read --postured--.

COLUMN 18:

Line 12, "thus calculated" should read --thus-calculated--; and
    Line 44, "box" should read --b0x--.

COLUMN 20:

Line 3, "gazes" should read --gazes at--.

UNITED STATES PATENT AND TRADEMARK OFFICE
CERTIFICATE OF CORRECTION

PATENT NO. : 5,717,959
DATED : February 10, 1998
INVENTOR(S) : TATSUYUKI TOKUNAGA It is certified that error appears in the above-identified patent and that said Letters Patent is hereby corrected as shown below:

COLUMN 21:

Line 10, "an" should be deleted.
    Line 33, "signal" should read --signal)--;
    Line 34, "signal)" should read --signal--; and
    Line 54, "in" should be deleted.

COLUMN 22:

Line 29, "posturized" should read --postured--.

COLUMN 23:

Line 4, "address." should read --addresses.--; and
    Line 41, "then and" should read --and then--.

Signed and Sealed this

Fifteenth Day of December, 1998

*Attest:*

BRUCE LEHMAN
*Attesting Officer*     *Commissioner of Patents and Trademarks*